United States Patent
Beam

(10) Patent No.: US 12,189,373 B2
(45) Date of Patent: Jan. 7, 2025

(54) SAFETY SYSTEM FOR A POWERED SYSTEM

(71) Applicant: Gatekeyper, LLC, Shelby, NC (US)

(72) Inventor: Morgan Beam, Shelby, NC (US)

(73) Assignee: Gatekeyper, LLC, Shelby, NC (US)

( * ) Notice: Subject to any disclaimer, the term of this patent is extended or adjusted under 35 U.S.C. 154(b) by 924 days.

(21) Appl. No.: 17/196,112

(22) Filed: Mar. 9, 2021

(65) Prior Publication Data
US 2022/0291667 A1    Sep. 15, 2022

(51) Int. Cl.
| | | |
|---|---|---|
| *G05B 19/41* | (2006.01) | |
| *G05B 19/418* | (2006.01) | |
| *H04W 64/00* | (2009.01) | |
| *H04W 84/18* | (2009.01) | |
| *G07C 9/00* | (2020.01) | |

(52) U.S. Cl.
CPC ..... *G05B 19/4185* (2013.01); *G05B 19/4183* (2013.01); *G05B 19/4184* (2013.01); *H04W 64/003* (2013.01); *H04W 64/006* (2013.01); *H04W 84/18* (2013.01)

(58) Field of Classification Search
CPC ............ G05B 19/4185; G05B 19/4183; G05B 19/4184; H04W 64/003; H04W 64/006; H04W 84/18; G07C 2009/00769; G07C 2209/63; G07C 9/00309; F16P 3/08
USPC .......................................................... 700/9
See application file for complete search history.

(56) References Cited

U.S. PATENT DOCUMENTS

| | | | |
|---|---|---|---|
| 7,287,224 B2 * | 10/2007 | Beam, III | ................ G09B 7/02 434/323 |
| 10,447,864 B1 | 10/2019 | Rapp et al. | |
| 2009/0224879 A1 * | 9/2009 | Nakazawa | ......... G07C 9/00309 340/5.72 |

(Continued)

FOREIGN PATENT DOCUMENTS

| | | |
|---|---|---|
| WO | 2016007332 A1 | 1/2016 |
| WO | 2019048735 A1 | 3/2019 |

OTHER PUBLICATIONS

Application No. PCT/US2022/019229, International Search Report and Written Opinion, Mailed on Jul. 20, 2022, 11 pages.

(Continued)

*Primary Examiner* — Michael J Brown
(74) *Attorney, Agent, or Firm* — Kilpatrick Townsend & Stockton LLP

(57) ABSTRACT

Systems and associated methods for selectively enabling and disabling a powered system include an interlock device and a control system. The interlock device may enable or disable operation of the powered system. The control system may disable operation of the powered system with the interlock device, receive at least one answer to at least one question from a user of the access device, and enable operation of the powered system with the interlock device based on the at least one answer meeting a predetermined criteria. In some cases, the control system enables or disables operation of the powered system based on a distance between an access device and the interlock device, based on a status of the powered system after enabling operation, or based on a communication status of the access device after enabling operation of the powered system.

19 Claims, 25 Drawing Sheets
(10 of 25 Drawing Sheet(s) Filed in Color)

(56) References Cited

U.S. PATENT DOCUMENTS

2014/0118154 A1\* 5/2014 Grounds ............... G06Q 10/20
340/686.1
2020/0285726 A1 9/2020 Kalous

OTHER PUBLICATIONS

PCT/US2022/019229, "International Preliminary Report on Patentability," Sep. 21, 2023, 8 pages.

\* cited by examiner

SAFETY SYSTEM FOR A POWERED SYSTEM

FIELD OF THE INVENTION

This application relates to articles of powered systems, and more particularly to safety computer systems and associated methods for selectively enabling and disabling powered systems.

BACKGROUND

Many powered systems, including but not limited to pieces of machinery, manufacturing equipment, vehicles, and the like, may perform self-diagnostic tests before their operation is enabled to help ensure the operational safety of such powered systems. However, many injuries associated with powered systems is due to operator or user error, which is commonly caused by a lack of adequate safety training and/or a lack of familiarity of the operator or user with proper safety procedures.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a system for selectively enabling and disabling a powered system includes an interlock device and a control system. The interlock device selectively enables or disables operation of a powered system and includes a communication module to wirelessly communicate with an access device. The control system is in wireless communication with the interlock device and wirelessly communicates with the access device. In certain aspects, the control system may disable operation of the powered system, determine a position of the access device relative to the interlock device, provide at least one question to a user of the access device responsive to the determination that the position of the access device is within a predetermined distance from the interlock device, and receive at least one answer to the at least one question from a user of the access device. The control system may enable operation of the powered system with the interlock device based on the position being within the predetermined distance and based on the at least one answer meeting a predetermined criteria.

According to some embodiments, a method of selectively enabling and disabling a powered system includes disabling operation of the powered system with an interlock device, receiving a location of an access device relative to an interlock device, and determining whether the location is within a predetermined distance from the interlock device. The method may include receiving at least one answer to at least one question from a user of the access device, and enabling operation of the powered system based on the position being within a predetermined distance and based on the at least one answer meeting a predetermined criteria.

According to some embodiments, a system for selectively enabling and disabling a powered system includes an interlock device that selectively enables or disables the powered system, and a control system in wireless communication with the interlock device. The control system may disable operation of the powered system with the interlock device, receive at least one answer to at least one question from a user of an access device, and enable operation of the powered system with the interlock device based on the at least one answer meeting a predetermined criteria. In certain aspects, the control system may receive a status of the powered system after enabling operation of the powered system, and disable operation of the powered system with the interlock device based on the powered system having a deactivated status for a predetermined time period after enabling operation of the powered system.

According to some embodiments, a method of selectively enabling and disabling a powered system includes disabling operation of the powered system with an interlock device, receiving at least one answer to at least one question from a user of an access device, and enabling operation of the powered system with the interlock device based on the at least one answer meeting a predetermined criteria. The method may include receiving a status of the powered system after enabling operation of the powered system, and disabling operation of the powered system with the interlock device based on the powered system having a deactivated status for a predetermined time period after enabling operation of the powered system.

According to certain embodiments, a system for selectively enabling and disabling a powered system includes an interlock device to selectively enable or disable operation of the powered system, and a control system in wireless communication with the interlock device and configured to wirelessly communicate with an access device. The control system may disable operation of the powered system, receive at least one answer to at least one question from a user of an access device, and enable operation of the powered system with the interlock device based on the at least one answer meeting a predetermined criteria. In various aspects, the control system may receive a status of the powered system after enabling operation of the powered system, receive a communication status of the access device with the control system after enabling operation of the powered system, and disable operation of the powered system with the interlock device based on the powered system having an activated status and based on the communication status being deactivated for a predetermined time period after enabling operation of the powered system.

According to various embodiments, a method of selectively enabling and disabling a powered system includes disabling operation of the powered system with an interlock device, receiving at least one answer to at least one question from a user of an access device, and enabling operation of the powered system with the interlock device based on the at least one answer meeting a predetermined criteria. The method may include receiving a status of the powered system after enabling operation of the powered system, receiving a communication status of the access device after enabling operation of the powered system, and disabling operation of the powered system with the interlock device based on the powered system having an activated status and based on the communication status being deactivated for a predetermined time period after enabling operation of the powered system.

According to certain embodiments, a method for controlling a controllable identification includes receiving, by a scheduling module, an event identification having an event type, an event start date, and an event end date. The method also includes receiving, by the scheduling module, a recurrence for the event identification that repeats the event identification at a recurrence interval. In various embodiments, the method includes receiving, by the scheduling module, an occurrence for the event identification within a single recurrence interval. The occurrence includes first time slot for the event identification within the single recurrence interval and a second time slot for the event identification within the single recurrence interval, and in certain embodiments the first time slot and the second time slot are discontinuous. The method may include generating a schedule having the occurrence of the event identification repeated at the recurrence interval starting at the event start date, assigning the schedule to at least one controllable identification, receiving an actual time, and controlling the at least one controllable identification based on the actual time being within the first time slot or the second time slot.

According to various embodiments, a system for controlling a powered system includes a control system configured to wirelessly communicate with an access device and a powered system. The control system may be configured to disable operation of the powered system, receive a user credential from the access device, compare the user credential to authorized user credentials, and provide an access portal to the access device based on the user credential being an authorized user credential. In certain embodiments, the control system is configured to receive a selection of the powered system from the access device, responsive to receiving the selection of the powered system from the access device and based on the user credential being the authorized user credential, provide at least one question to a user of the access device, and receive at least one answer to the at least one question from a user of the access device. In various embodiments, the control system is configured to enable operation of the powered system based on the at least one answer meeting a predetermined criteria.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
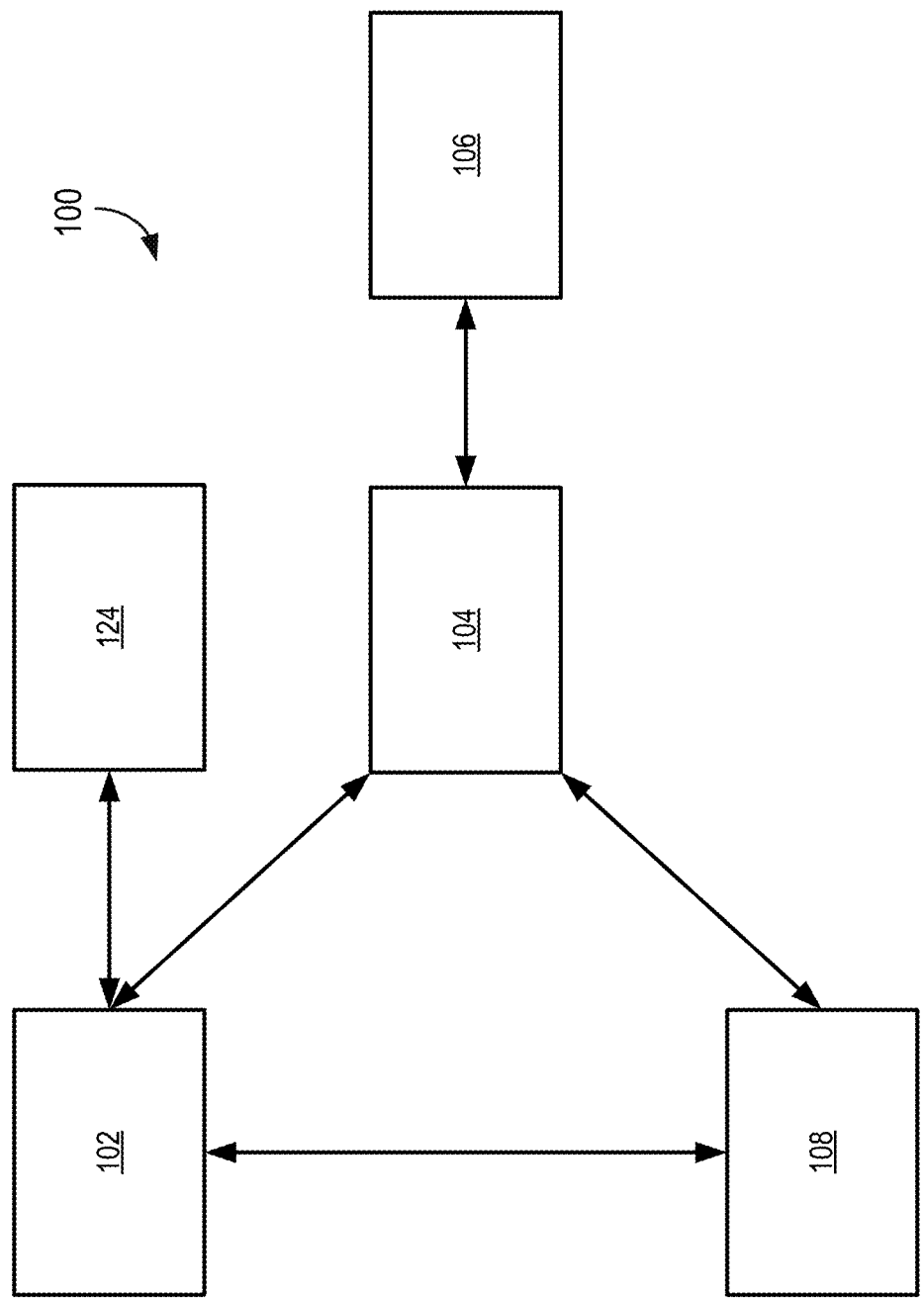
FIG. 1 is a schematic diagram of a safety system for a powered system according to various embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein are safety systems for powered systems. The safety systems generally include a control system and at least one interlock device associated with at least one powered system. Powered systems that may utilize the safety systems described herein may include, but are not limited to, pieces of machinery, pieces of manufacturing equipment, vehicles (such as automobiles, trucks, motorcycles, boats, aircraft, forklifts, construction vehicles, etc.), consumer powered systems (such as lawnmowers, snow blowers, ovens, etc.), and other powered systems as desired. Moreover, it will be appreciated that certain objects or devices may include more than one powered system. In such embodiments, each powered system may have a dedicated interlock device, or a single interlock device may selectively enable or disable operation of each powered system. The safety systems described herein may selectively enable or disable operation of the powered systems by ensuring that an operator or user of the powered systems has had adequate safety training and/or is familiar with safety procedures before he or she is allowed to operate a particular powered system. In certain aspects, the safety systems described herein may selectively enable operation of powered systems based at least on answers to one or more questions from the user meeting a set of predetermined criteria.

In various embodiments, the safety systems described herein may optionally selectively enable operation of powered systems based on answers to one or more questions meeting the set of predetermined criteria as well as based on a position of the access device of the user and an interlock associated with a powered system being within a predetermined distance. Such embodiments may optionally provide improved control of access to the powered system by ensuring that the user answering the question(s) about the powered system is within proximity to the powered system and not, for example, being accessed by one user for another user that has not provided answers to the questions.

In some embodiments, the safety systems described herein may also provide an activation period for a predetermined duration and after enabling operation of powered systems during which the user may activate the powered systems. In certain embodiments, the safety systems may disable operation of the powered systems based on the powered systems not being activated within the activation period, which may minimize or prevent unauthorized access to the powered systems.

In certain embodiments, the safety systems described herein may also provide a safety access period for a predetermined duration after enabling operation of powered systems and activation of the powered systems. In some cases, the safety access period may provide a time period during which an access device of the user may purposefully or inadvertently lose communication with the control system and/or interlock device while still enabling operation of the powered system and/or allowing for a re-establishment of communication without requiring answers to questions to enable operation of the powered systems. After the predetermined duration, the safety systems may disable operation of the powered systems based on communication not being re-established during the safety access period. In one non-limiting embodiment, the safety access period may allow for the user to troubleshoot and/or re-establish operation of the powered systems if the powered systems stalled out or were deactivated in a dangerous location (e.g., on a railroad track).

Scheduling modules that allow for scheduling and that generate schedules are also described herein. The scheduling modules described herein may be used with the safety systems, although they need not in other embodiments. In certain aspects, the scheduling modules described herein may allow for and may generate schedules with recurrences for an event having a unique identification, and the scheduling modules may optionally allow for at least two disconnected time slots within each recurrence.

FIG. 1 illustrates a safety system 100 according to various embodiments. The safety system 100 generally includes a control system 102 and an interlock device 104 that is associated with a powered system 106. The safety system 100 may also include an access device 108 for a user or operator. Optionally, the safety system 100 may include a sensor 124 for detecting one or more characteristics of the safety system 100, including but not limited to a status of the powered system 106, a status of communication between the access device 108 and the control system 108 and/or interlock device 104, or other characteristics as desired. The number of interlock devices 104, powered systems 106, sensors 124, and access devices 108 illustrated should not be considered limiting, as in various embodiments the safety system 100 may be provided for any number of powered systems 106 and/or access devices 108 as desired 106. In embodiments where a plurality of powered systems 106 are provided, the type of one powered system 106 need not be the same as the type of another powered system 106. As a non-limiting embodiment, the safety system 100 may be provided for two powered systems 106: a forklift and a chipper.

The control system 102 may include at least one processor and/or at least one memory. The processor may be a general purpose processing unit or a processor specially designed for safety system applications or a processor specially designed for wireless communications (such as a Programmable System On Chip (PSOC) from Cypress Semiconductor or other suitable processors) The memory may include a long-term storage memory and/or a short term working memory. The memory may be used by the processor to store a working set of processor instructions. The processor may write data to the memory. The memory may optionally include one or more instruction modules that may provide instructions for the processor to perform various functions related to the safety system 100, as described in detail below. As used herein, instructions refer to computer-implemented steps for processing information in the system. Instructions may be implemented in software, firmware or hardware and include any type of programmed step undertaken by components of the system. The memory may also store data from the various components of the safety system 100. Optionally, the control system 102 may also include at least one server, and the server may include at least one memory and at least one processor. A computer program with one or more processes or sets of instructions described herein may be loaded onto the memory of the server.

In various embodiments, the control system 102 includes an identification module which may include identification data for one or more users, identification data for one or more powered devices, identification data for one or more interlock devices 104, identification data for one or more questions, and/or other identification data for the safety system 100 as desired. The identification module may be stored in the memory of the control system 102, the memory of the server, or various other suitable locations as desired.

The interlock device 104 is associated with the powered system 106 and is configured to selectively enable or disable operation of the powered system 106 as will be discussed in detail below. In some embodiments, the interlock device 104 may be physically mounted or otherwise connected to the powered system 106, although it need not be in other embodiments. In certain embodiments, the interlock device 104 may be removably connected to the powered system 106 such that the interlock device 104 can be changed from one powered system 106 to another. In some cases, the interlock device 104 may directly communicate with the control system 102 or may indirectly communicate with the control system 102 (e.g., via an intermediate connection to the access device 106 or other communication node).

Figure 2:
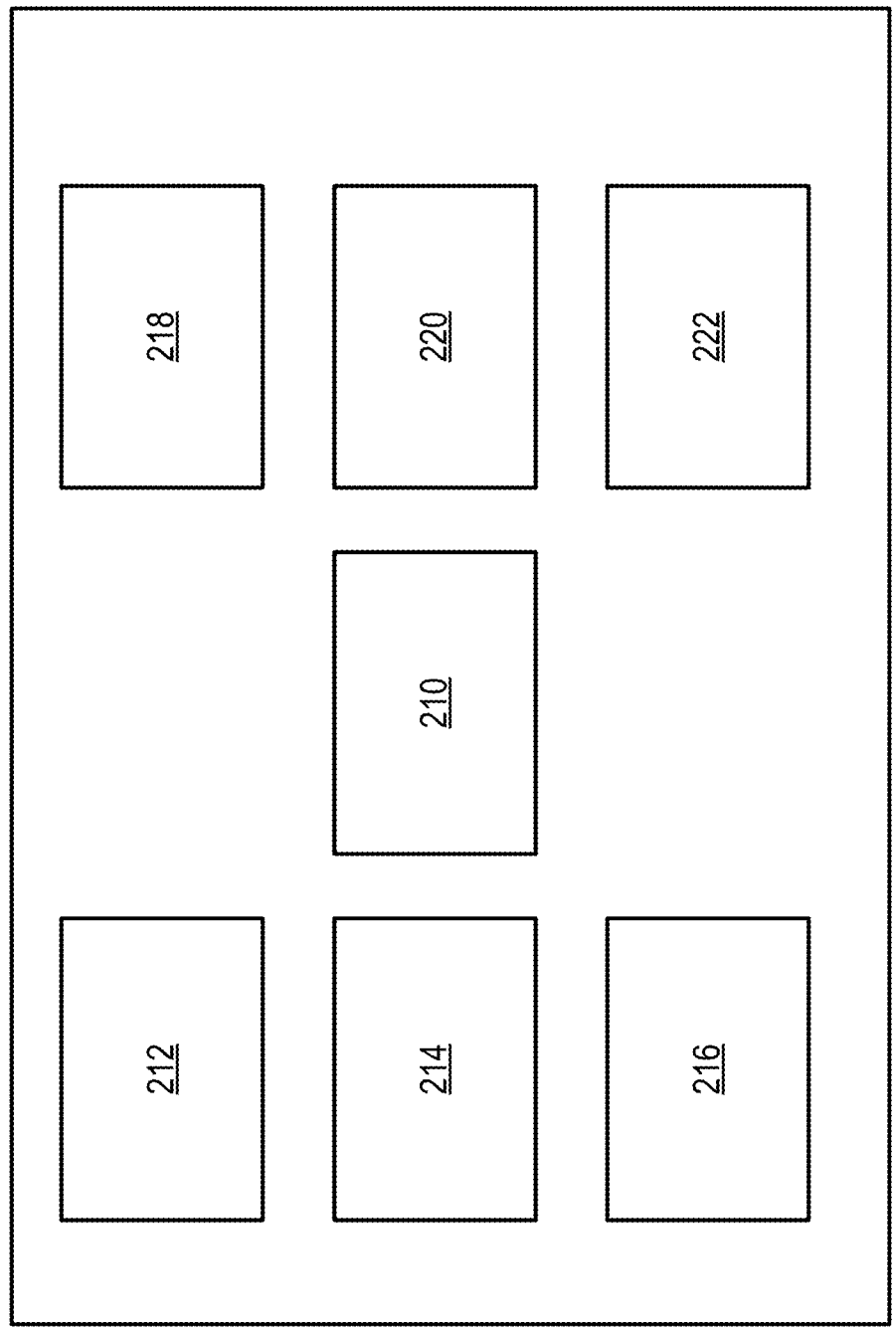
FIG. 2 is a schematic diagram of an interlock device of the safety system of FIG. 1.

Referring to FIG. 2, in certain embodiments, the interlock device 104 may include various features as desired. In some embodiments, the interlock device 104 includes a disabling/enabling feature 210 for selectively enabling and/or disabling the powered system 106. In some embodiments, the disabling/enabling feature 210 may include a switch or relay operable for selectively enabling or disabling the powered system 106, although various other types of disabling/enabling features 210 may be utilized as desired.

In certain embodiments, the interlock device 104 includes a communications module 212. The communication module 212 may be a wired or wireless system that allows for communication with other devices of the safety system 100, such as the control system 102 and/or the access device 108. The communication module 212 may include at least one of a transmitter, a receiver, or a transceiver. In some embodiments, the communication module 212 connects wirelessly to another device via radio, LAN, Bluetooth®, network, Wi-Fi, and/or other suitable connections as desired. In one non-limiting example, the communication module 212 is a Bluetooth® beacon with an antenna such that the communication module 212 provides for Bluetooth® communication. The communication module 212 may also be a port, jack or other plug for inserting a cable to connect to another device.

Optionally, the interlock device 104 may include one or more indicators 214 that may selectively provide an indication of whether the powered system 106 has been enabled or disabled. The indicators 214 may be various types of indicators as desired, including but not limited to visual indicators or auditory indicators. In one non-limiting embodiment, the indicators 214 include a plurality of light sources that are selectively activated based on a status of the powered system 106 (e.g., enabled or disabled). In another non-limiting embodiment, the indicator 214 is a single light source, and the control system 102 may selectively control a characteristic of light emitted from the light source (e.g., pattern, color, brightness, etc.) based on the status of the powered system 106. The interlock device 104 may optionally include a power supply 216 in various embodiments suitable for selectively powering the components of the interlock device 104. The power supply 216 may be various suitable power supplies as desired, including but not limited to an alternating-current/direct-current power source, a battery, a solar cell, combinations thereof, or other suitable devices as desired. In other embodiments, the interlock device 104 need not have a separate power supply, and the interlock device 104 may instead be powered by another system or device (such as, but not limited to, the powered system 106).

In various embodiments, the interlock device 104 may optionally include at least one processor 218 and/or at least one memory 220, which may be similar to or different from the memory and processor of the control system 102. Optionally, the interlock device 104 may include an override feature 222 that may be selectively activated for a predetermined duration. In some cases, activation of the override feature 222 may enable operation of the powered system 106 for the predetermined duration without requiring answers to meet the set of predetermined criteria. In the predetermined duration for the override feature 222 may be various durations as desired. In one non-limiting example, the predetermined duration may be twenty-four hours. The override feature 222 may be various suitable devices or components as desired, and in one non-limiting embodiment, the override feature 222 may be a mechanical switch or button. The interlock device 104 may optionally include other features as desired such as various input/output interfaces or other features as desired.

As previously mentioned, the powered system 106 may be various suitable powered systems as desired, including but not limited to, pieces of machinery, pieces of manufacturing equipment, vehicles, consumer powered systems, and other powered systems as desired. In some embodiments, certain objects or devices may include more than one powered system. In such embodiments, each powered system 106 may have a dedicated interlock device 104, or a single interlock device 104 may selectively enable or disable operation of each powered system.

The access device 108 may be a portable device such as a smartphone, tablet, or other electronic device as desired, although the access device 108 need not be portable in other examples. In various embodiments, the access device 108 includes a user interface such that the user can use the access device 108 to be connected with the safety system 100 and interact with the safety system 100 (see, e.g., FIGS. 7-11). The access device 108 may be a part of the safety system 100 and/or may be a personal device owned by the user that can be connected to the safety system 100 via a computer program, such as a dedicated application, or via various connections.

The sensor 124 may detect one or more characteristics of the safety system 100. While illustrated as a separate component, in certain embodiments, the sensor 124 may be incorporated into one or more devices of the safety system 100 as desired and/or depending on a desired characteristic to be sensed. As some non-limiting examples, the sensor 124 may be incorporated into the powered system 106, the interlock device 104, and/or the access device 108. In certain examples, the safety system 100 includes a plurality of sensors 124 such that a plurality of characteristics of the safety system 100 may be detected. In various examples, the sensor 124 may include, but is not limited to, a geolocation sensor (e.g., GPS), a proximity sensor, a presence sensor, a temperature sensor, a pressure sensor, a switch, an indoor positioning sensor, an outdoor positioning sensor, a powered systems sensor, or various other suitable sensors, or any combination thereof that may detect one or more characteristics of the safety system 100.

In one non-limiting embodiment, the sensor 124 may be a sensor that may be used to wirelessly locate objects relative to the interlock device 104 and/or the powered system 106 via dead reckoning, Wi-Fi based positioning, Bluetooth®, Received Signal Strength Indication, geo-fencing, or other suitable technology. In these embodiments, the sensor 124 may actively locate people or objects (e.g., the access device 108) within a predefined area or distance from the interlock device 104 or may provide an ambient location or environmental context for devices to get sensed. In some embodiments, the location of the access device 108 may be determined and/or received relative to another component (e.g., the interlock device 104), and the safety system may determine whether the location of the access device 108 is within a predetermined distance from the component. In other examples, the positioning sensor may be omitted, and the distance from the interlock device 104 to the access device 108 (or other device) is provided via the Bluetooth or other suitable wireless systems (e.g., based on signal strength or other properties of wireless communications). As one non-limiting example, the distance between the interlock device 104 and the access device 108 (or other device)

may be determined based on signal strength between the interlock device 104 and the access device 108, and a predetermined signal strength may indicate that the access device 108 is within a predetermined distance from the interlock device 108.

In another embodiment, the sensor 124 may detect at least one characteristic of the powered system 106. In these embodiments, the at least one characteristic of the powered system 106 may be used to determine a status of the powered system 106. As a non-limiting example, the sensor 124 may be a pressure sensor, temperature sensor, and/or other sensor as desired that can detect a characteristic of the powered system 106 that can be used to determine a status of the powered system 106. Various other types of sensors 124 may be utilized with the safety system 100 as desired.

Figure 3:
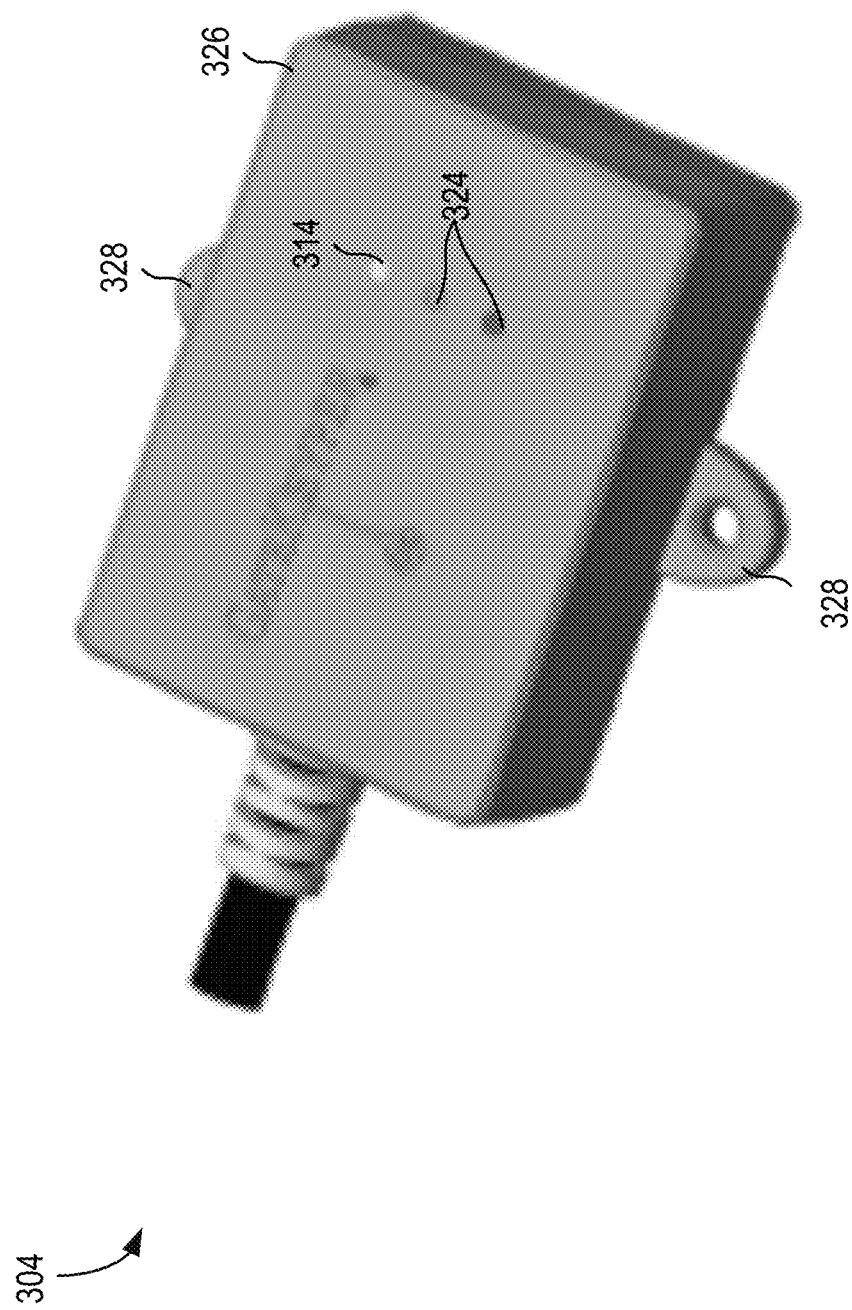
FIG. 3 illustrates another interlock device for a safety system according to various embodiments.

FIG. 3 illustrates another embodiment of an interlock device 304 that may be substantially similar to the interlock device 104. As illustrated in FIG. 3, the interlock device 304 includes a housing 326 and optionally includes one or more mounting features 328 such that the interlock device 104 can be secured at a location as desired. In certain embodiments, the interlock device 304 may be supplied with power systems in environmentally harsh environments. In such embodiments, the housing 326 may be constructed from various materials such that the interlock device 304 meets various standards for withstanding dust, heat, moisture, vibration, combinations thereof, or other criteria as desired. In one non-limiting embodiment, the interlock device 304 may have an ingress protection rating of at least IP67 as set forth by the International Electrotechnical Commission standard 60529. In the embodiment of FIG. 3, the interlock device 304 includes three visual indicators 314 that are selectively activated or deactivated depending on a status of the interlock device 304 (e.g., such as whether operation of the powered system is enabled or disabled).

Figure 4:
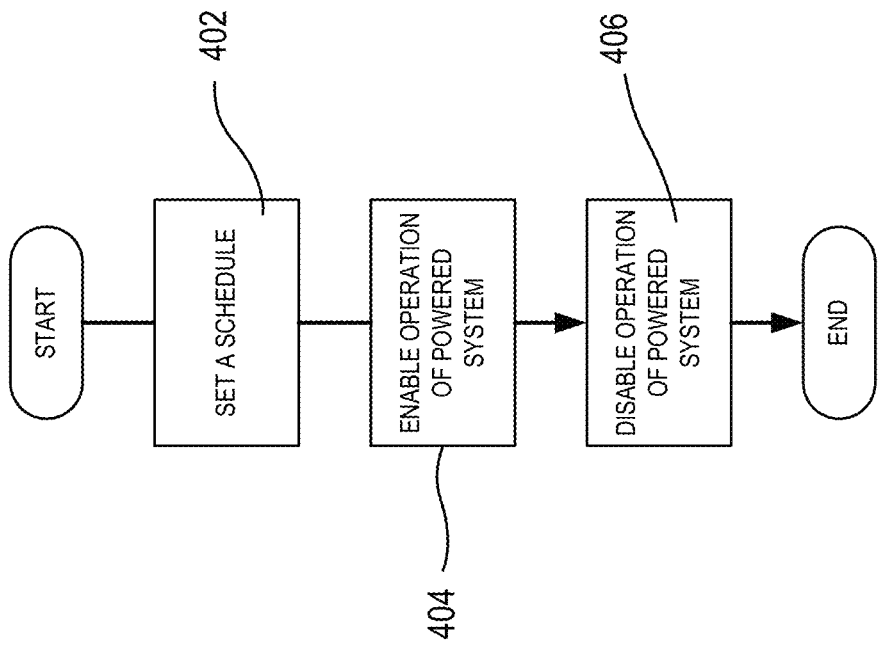
FIG. 4 is a generic flow chart of a method of controlling a powered system with a safety system according to various embodiments.

FIG. 4 is a flowchart of various processes that can be performed by the safety system 100. As illustrated in FIG. 4, the safety system 100 may include an optional scheduling process 402, a process 404 enabling operation of the powered system, and a process 406 disabling operation of the powered system. These processes and/or sub-processes may be implemented by the server, the control system 102, the interlock device 104, or combinations thereof. It will be appreciated that all of the steps processes illustrated in FIG. 4 need not be implemented, and various embodiments of the safety system 100 may utilize a subset of the steps or sub-processes. Various illustrative logical blocks, modules, and method steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Artisans may implement the described functionality in varying ways for each particular application, but such implementation decisions should not be interpreted as causing a departure from the scope of the present disclosure.

Figure 5:
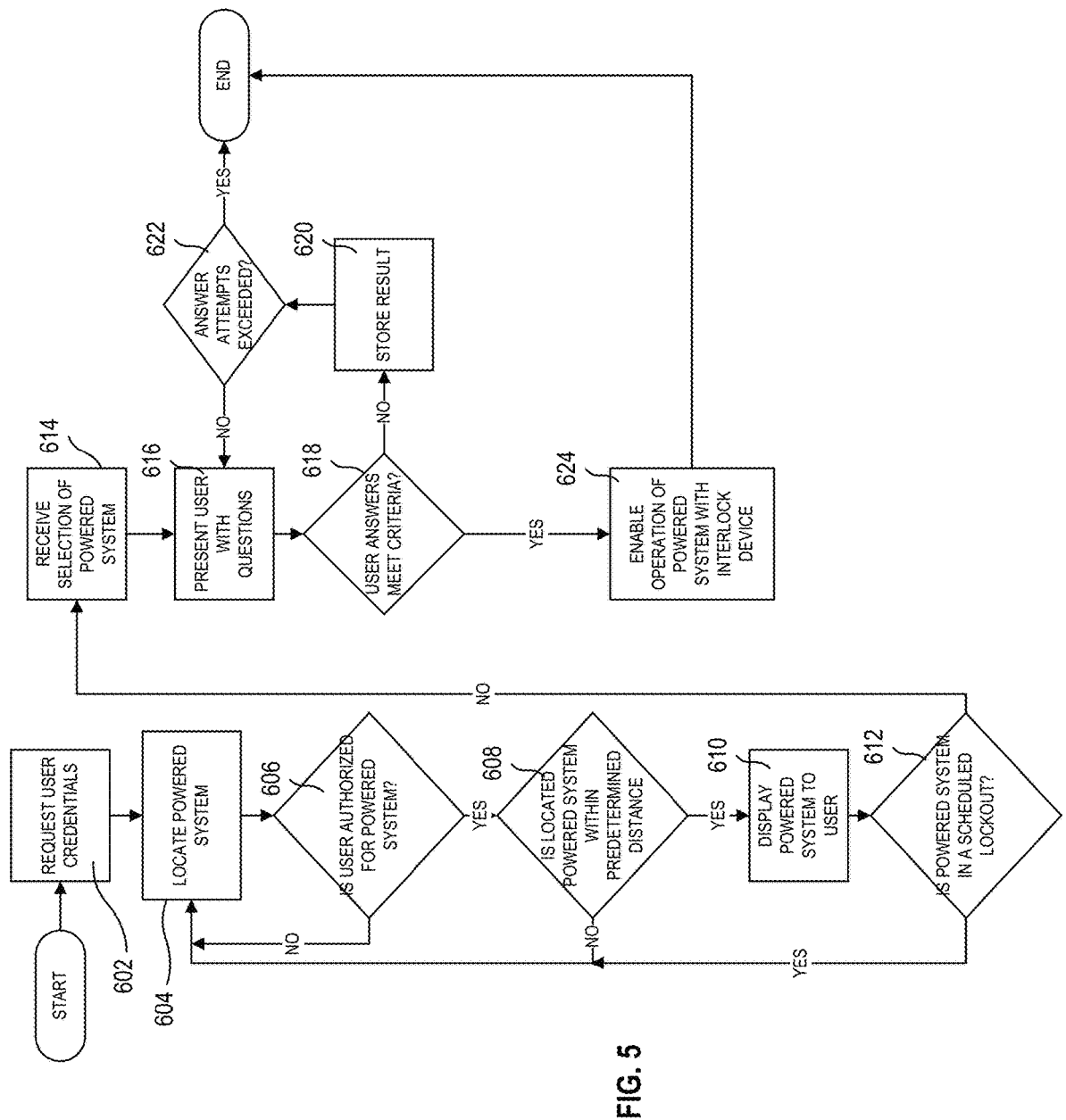
FIG. 5 is a flow chart of an enabling process according to various embodiments.

FIG. 5 illustrates an example of the enabling process 404 according to various embodiments, and will be discussed in conjunction with FIGS. 7-10, which illustrate a user interface 830 of an access device at various stages of the process. The particular user interface 830 illustrated in FIGS. 7-10 should not be considered limiting on the disclosure.

Figure 7:
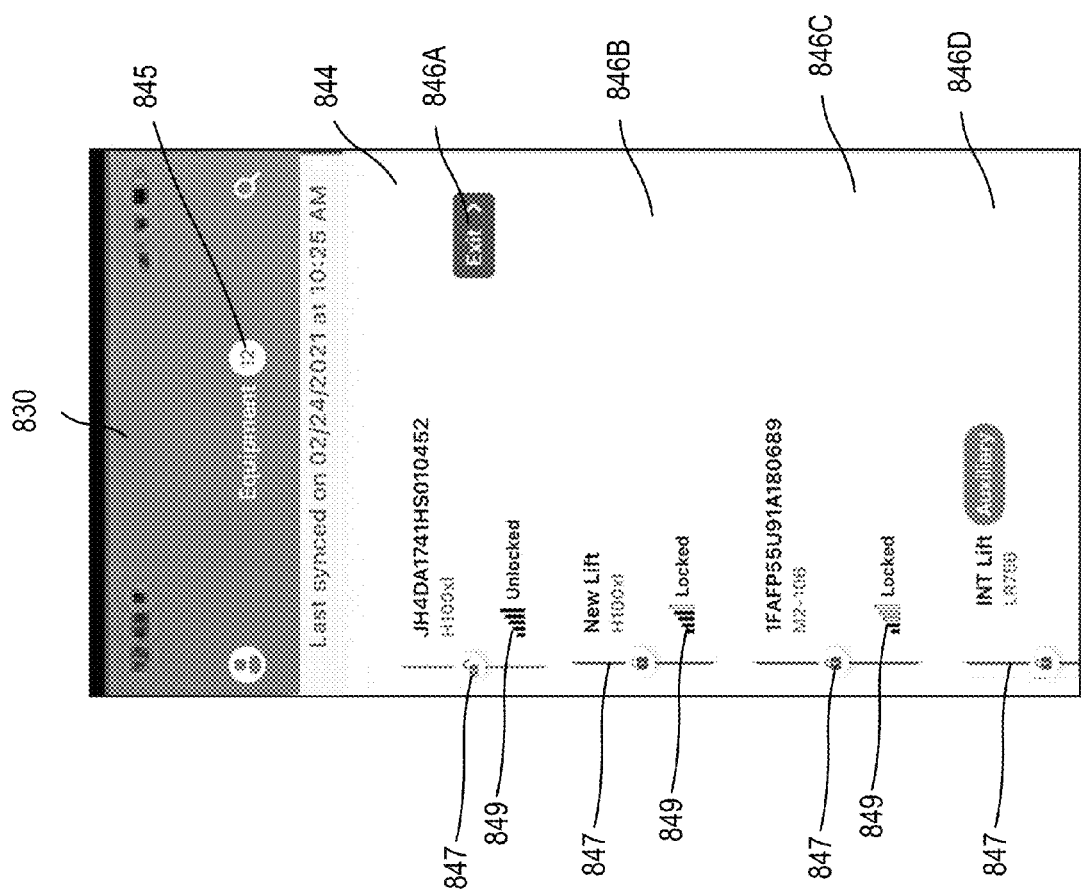
FIG. 7 illustrates a user interface on an access device during a process performed by a safety system according to various embodiments.

In a block 602, the process includes requesting user credentials from a user. In certain aspects, requesting user credentials may include prompting the user for user credentials via the user interface 830 of the access device. Block 602 may include receiving user credentials. In some cases, the process may determine whether the user credentials are authorized to access the safety system 100. In some embodiments, the process may compare the user credentials received from the user with authorized user credentials, existing licenses, etc. In various cases, the process may include providing an access portal to user via the user interface on the access device based on the user credential being an authorized user credential. As one non-limiting embodiment, FIG. 7 illustrates an access portal 844 being provided to the user via the user interface 830 based on the received user credentials being authorized user credentials. As illustrated in FIG. 7, the user interface 830 may include representations 846A-B corresponding to four powered systems. As discussed in detail below, the representations 846 may optionally be selectable or not selectable based on the user credentials being authorized credentials and/or optionally based on the access device being within a predetermined distance of the powered system. While four representations are illustrated, any number of representations may be provided based on powered systems that the user credentials are authorized for, powered systems within the predetermined distance, combinations thereof, etc. As illustrated in FIG. 7, the user interface 830 may optionally include a visual indicator 845 indicating a total number of powered systems that the user credentials are authorized for and/or a total number of powered systems within the predetermined distance. In certain embodiments, the user interface 830 may include status indicators 847 for each powered system. In certain embodiments, the status indicators 847 may be visual indicators, and at least one characteristic of the visual indicators may be controlled based on the status of the particular powered system. In the embodiment of FIG. 7, the status indicators 847 include both a graphic and a color indicator, although other indicators may be utilized. As illustrated in FIG. 7, the status indicator 847 representation 846A includes a green indicator and an unlock graphic representing that the associated powered system is unlocked and/or may otherwise be accessed by the user, and the status indicators 847 for representations 846B-D include a red indicator and a lock graphic representing that the associated powered systems are locked and/or otherwise cannot be accessed by the user. Optionally, the user interface 830 may include proximity indicator 849 for each powered system. At least one characteristic of the proximity indicator may be adjusted based on the distance between the access device and the powered system and/or interlock device. In the embodiment of FIG. 7, the proximity indicator 849 includes bars representing the signal strength between the access device and the powered system and/or interlock device, which as discussed may correspond to the distance between the devices.

Optionally, prior to block 602, the method may include disabling the powered system with the interlock device.

In a block 604, the process includes locating one or more powered systems. In some cases, block 604 may include locating one or more interlock devices associated one or more powered systems. Locating the one or more powered systems may include locating the one or more powered systems using one or more of the sensors 124, although it need not in other embodiments. In various cases, locating one or more powered systems may include determining a geolocation of the interlock device and/or the powered system, a proximity of the interlock device and/or the powered system to another system or device (e.g., the control system 102 and/or the access device 108), wirelessly locating the interlock device and/or the powered system, combinations thereof, or other suitable methods or techniques as desired.

In a block 606, the process includes determining if the user is authorized to operate a located power system. In some cases, block 606 may optionally include comparing the user credentials to powered system credentials and determining whether the user credentials include the requisite powered system credentials. In certain aspects, the powered system credentials may be based on previous testing, training, or otherwise. If the user is not authorized to operate a located power system, the process returns to block 604, and if the user is authorized to operate the located power system (e.g., based on the user credentials having the requisite powered system credentials), the process proceeds to a block 608.

In block 608, the process optionally includes determining if a located power system is within a predetermined distance of the access device, or vice versa. In some cases, the predetermined distance may optionally correspond with a general area relative to the powered system that the user needs to be in to potentially operate the powered system. Block 608 may be performed using various devices or techniques as desired, including using one or more of the sensors 124 and/or based on a signal strength between the access device and the interlock device of the located power system. In other embodiments, the process need not determine a proximity of the access device relative to other devices of the powered system in order to enable operation of the powered system. As a non-limiting example, an administrative or override feature may be provided to enable operation of the powered system while the access device is remote from the powered system.

In some embodiments, block 608 may be omitted, and the process may proceed to block 610 where the process includes displaying powered systems to the user. In some embodiments, block 610 includes displaying one or more powered systems based on the credentials of the user matching or otherwise being paired with a particular powered system. As a non-limiting embodiment, a group of powered systems may include a forklift powered system, a truck powered system, and a saw powered system, a user's credential may be associated with a forklift powered system and a truck powered system, and the process includes displaying the forklift powered system and the truck powered system while not displaying the saw powered system.

In various embodiments, if the powered system is optionally within the predetermined distance of the access device (or vice versa), in block 610, the process includes providing a representation of the powered system to the user on the user interface 830. In a block 612, the process may optionally include determining if the powered system is within a scheduled lock. In certain cases, block 612 may include comparing the current time with the schedule from the scheduling process 402. In other embodiments, block 612 may be omitted. In various embodiments, if the powered system is not within the predetermined distance of the access device (or vice versa) based on block 608 and/or if the powered system is within a scheduled lock based on block 612, the process may optionally return to block 604. In other embodiments, if the powered system is not within the predetermined distance of the access device (or vice versa) and/or if the powered system is within a scheduled lock based on block 612, the process includes providing a second, non-selectable representation of the powered system to the user on the user interface 830. As one non-limiting embodiment, FIG. 7 illustrates an example of the user interface 830 having four representations 846A-B corresponding to four powered systems. In this embodiment, representation 846A is selectable/may be selected by the user via the user interface 830 because the associated powered system is within the predetermined distance, the user has the requisite credentials, and optionally the powered system is not in a scheduled lock. Representations 846B-D are not selectable based on the associated power systems not being within the predetermined distance, the user not having the required credentials, and/or based on the powered system(s) being in a scheduled lock. In some cases, representations 846B-D may provide an indication of a scheduled lock status (e.g., display that it is in a "scheduled lock" or "scheduled unlock," for example). It is noted that blocks 604, 606, 608, 610, and 612 may be performed in any sequence or simultaneously as desired.

In a block 614, the process includes a selection of a powered system from the user of the access device and based on the powered system being within the predetermined distance, the user having the requisite credentials, and optionally the powered system not being in a scheduled lock.

Figure 8:
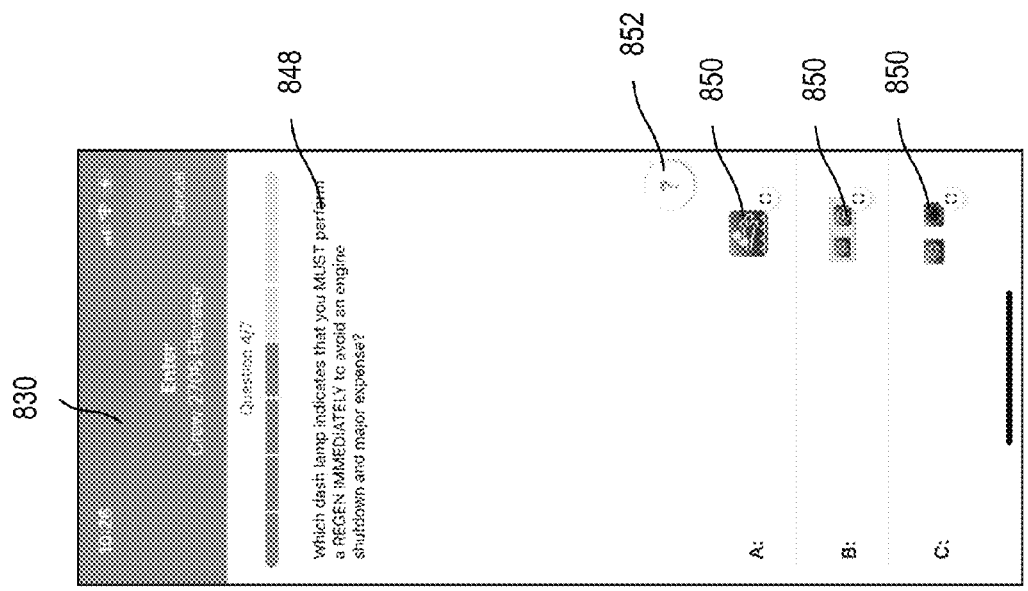
FIG. 8 illustrates a user interface on an access device during a process performed by a safety system according to various embodiments.

In a block 616, the process includes presenting the user with one or more questions via the user interface 830. FIG. 8 illustrates a non-limiting embodiment of a question 848 being presented to the user via the user interface 830. In certain aspects, the one or more questions may be based on the selected power system, and in various embodiments, the one or more questions may optionally be related to training and/or safety, and/or may be various other types of questions as desired. In various embodiments, the one or more questions presented may be customized to correspond to a given piece of machinery, vehicle, powered system, or the like, and may be periodically updated. The one or more questions may also be presented to the user in a random manner. The one or more questions may further be presented to the user in a plurality of languages. As one non-limiting example, the one or more questions may require an indication from the user that he or she has read and understands the contents of an operations manual for the powered system. In some embodiments, one or more of the questions may optionally be a credential question based on the user's credentials and/or credentials required for the powered system. In such embodiments, the credential question may prompt the user for some credential that is associated with the user (e.g., a security question, a username, a password, unique token, etc.) and/or a credential that is associated with the selected powered system (e.g., authorized user, password, unique token, etc.). In various aspects, the credential question may provide an additional safeguard to minimize unauthorized access of a particular powered system.

In certain embodiments, block 616 includes presenting the user with one or more possible responses or answers to the one or more questions. Optionally, presenting one or more possible responses may include providing an interface where a user can upload or otherwise provide additional material (e.g., text response, video, voice recording, picture, etc.) as part of the response. Optionally, presenting one or more possible responses or answers may include varying a position of each possible response or answer each time that the question is presented to the user. FIG. 8 illustrates a non-limiting embodiment of a plurality of answers 850 being presented to the user via the user interface 830.

Figure 10:
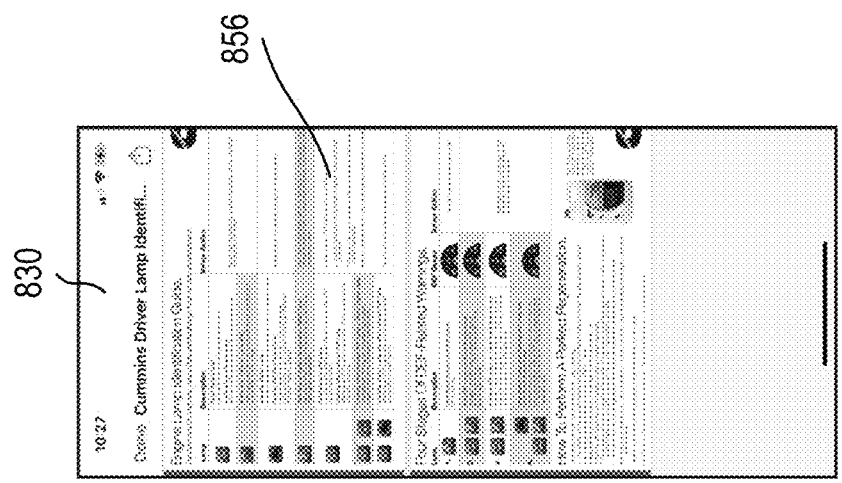
FIG. 10 illustrates a user interface on an access device during a process performed by a safety system according to various embodiments.
Figure 9:
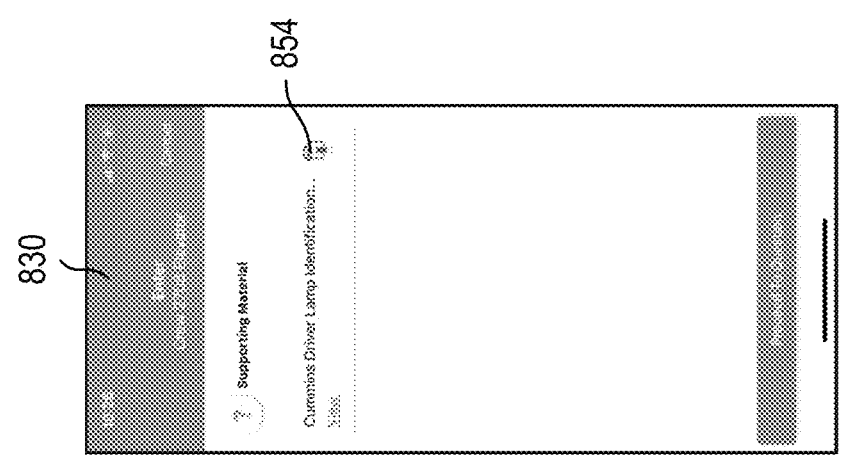
FIG. 9 illustrates a user interface on an access device during a process performed by a safety system according to various embodiments.

Optionally, presenting one or more questions may include providing supporting material with the at least one question in certain embodiments, the supporting material may include various materials providing additional training about the powered system as desired. As a non-limiting example, FIG. 8 illustrates a selectable representation 852 providing access to supporting material, FIG. 9 illustrates selectable supporting material 854 being provided to the user via the user interface 830 upon selection of the selectable representation 852, and FIG. 10 illustrates the actual supporting material 856 upon being selected in FIG. 9.

In a block 618, the process includes determining whether one or more answers from the user for the one or more questions meets a set of predetermined criteria. In one non-limiting example, the predetermined criteria may be a predetermined percentage of correct responses. In another non-limiting example, the one or more questions may optionally include at least one test question and/or at least one survey question, and the at least one test question may require a correct answer from the user to meet a set of predetermined criteria. Optionally, a correct answer to the at least one survey question may not be required to meet the set of predetermined criteria. Other predetermined criteria may be provided as desired. Optionally, the predetermined criteria may require a correct answer to at least one credential question.

In a block 620, if the user answers do not meet the predetermined criteria, the result may be stored (e.g., in a database in one or more memory units of the safety system 100). In a block 622, the process may include determining if the number of answer attempts from the user exceeds a predetermined number of answer attempts. If the user has attempted more answers than the predetermined answer attempts, the process may end, and the powered system may remain disabled. In certain embodiments, after exceeding the predetermined number of answer attempts, the process may have a lockout period during which the user is unable to attempt additional answers to enable operation of the powered system. Optionally, the user is notified that further training is necessary to operate the powered system. If the number of answer attempts has not been exceeded, the process may return to block 616.

In a block 618, based on the user answers meeting the set of predetermined criteria, the powered system is operationally enabled (e.g., mechanically, electrically, etc.) by the interlock device. Enabling operation of the powered system may allow for the powered system to be selectively activated and/or operated by the user. As a non-limiting example, when the powered system is the engine of a forklift, enabling operation of the powered system may allow for the engine to be started and/or the forklift to be driven. In certain embodiments, enabling operation of the powered system does not activate the powered system itself, but rather a separate action may be required from the user to activate the powered system. In other embodiments, enabling operation of the powered system may also include activating the powered system. From block 618, the safety system 100 may optionally proceed with one or more disabling processes 406.

Figure 6:
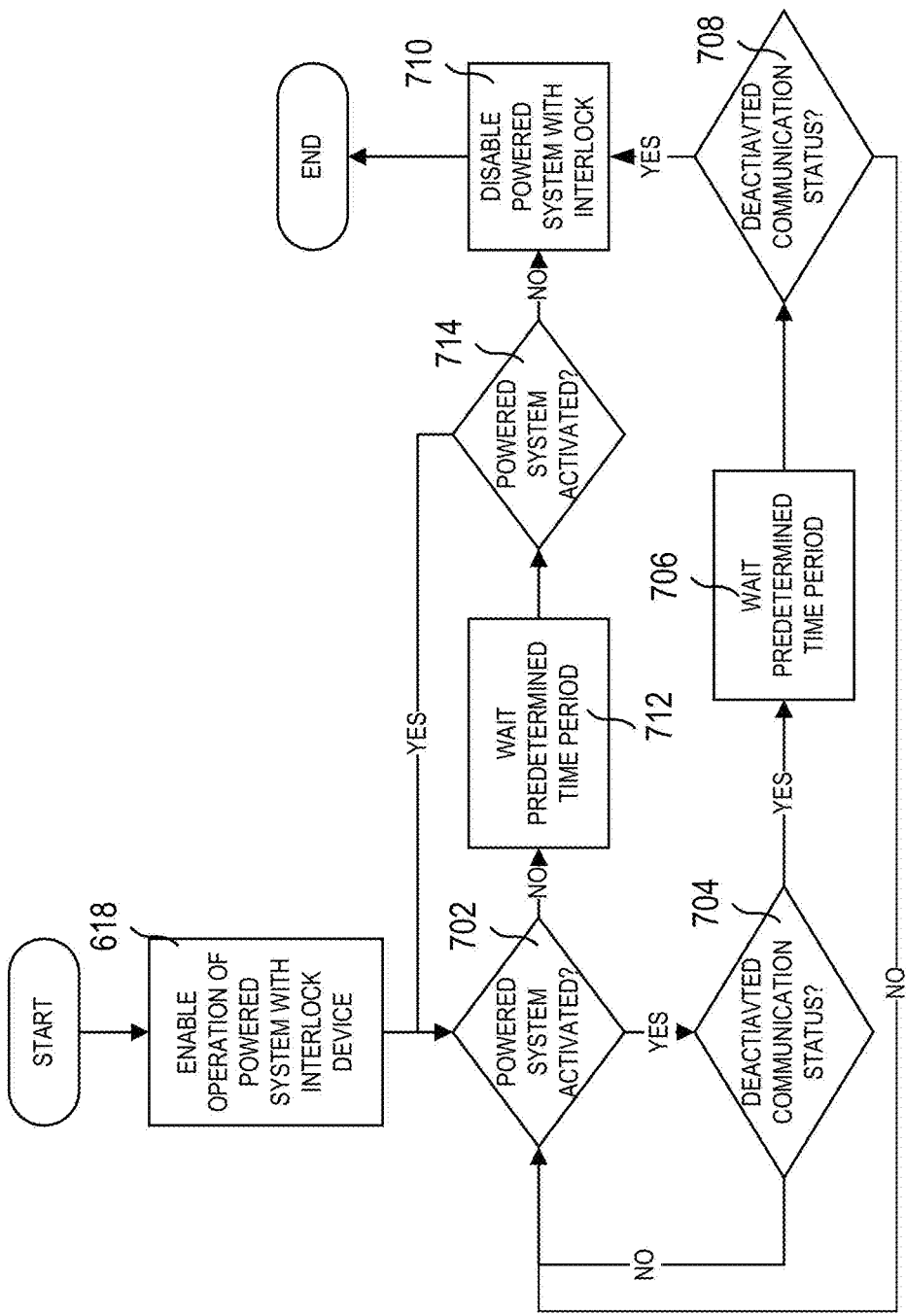
FIG. 6 is a flow chart of a disabling process according to various embodiments.

FIG. 6 illustrates an example of the disabling process 406 according to various embodiments. In FIG. 6, block 618 has been reproduced to illustrate the potential continuity between the enabling process 404 and the disabling process 406.

In a block 702, the process includes determining if the powered system is activated after operation of the powered system is enabled with the interlock device in block 618. In some cases, block 702 includes using one or more sensors 124 to determine whether the powered system has an activated status or a deactivated status.

If the powered system is activated, in a block 704, the process includes determining if a communication status of the access device 108 and/or the interlock device 104 is deactivated, meaning that there is no communication between the devices and/or the communication has been broken, whether purposefully or inadvertently. In some embodiments, block 704 may include using one or more sensors 124 to determine whether the access device 108 is communicatively coupled to the safety system 100, may include determining whether the user is still signed in to the access portal, or otherwise as desired. As one non-limiting embodiment, the communication status may include whether there is Bluetooth® and/or other wireless communication between the access device 108 and/or the interlock device 104 (or other device) and/or the communication has been broken. In other embodiments, block 704 may include determining whether the interlock device 104 and/or powered system 106 is communicatively coupled to the access device 108 and/or the control system 102.

In various embodiments, if the communication status is not deactivated (e.g., the access device 108 and/or the interlock device 104 are still in communication, the user is still signed on, etc.), the process may return to block 702. If the communication status is deactivated, the process may wait for a predetermined time period in block 706 and then re-check the communication status in block 708 after the predetermined time period. In certain embodiments, the predetermined time period is a safety access period. The predetermined time period may be various durations as desired. In some non-limiting examples, the predetermined time period may be 30 seconds, 45 seconds, 1 minute, 3 minutes, or 5 minutes. In one non-limiting example, the predetermined time period of block 706 is 45 seconds. In other embodiments, the predetermined may be other durations less than 30 seconds, greater than 5 minutes, or otherwise as desired. In certain embodiments, if the communication status is determined to be activated (not deactivated) in block 708, the process returns to block 702. In various embodiments, if the communication status is still determined to be deactivated in block 708, in block 710, the process includes disabling the powered system with the interlock, and the process ends.

In certain embodiments, if in block 702 the process determines that the powered system has not been activated, the process may include waiting for a predetermined time period in block 712, and re-checking the status of the powered system in block 714 after the predetermined time period. The predetermined time period of block 712 may be the same as or different from the predetermined time period of block 706. In certain embodiments, the predetermined time period is a safety access period. In one non-limiting embodiment, the predetermined time period of block 712 is 45 seconds. In various embodiments, if the powered system status is still determined to be deactivated in block 714, in block 710, the process includes disabling the powered system with the interlock, and the process ends.

As mentioned, the processes illustrated in FIGS. 5 and 6 may be utilized individually, together, or in any sub-combination as desired. Moreover, various sub-processes in each of the processes illustrated in FIGS. 5 and 6 may be omitted as desired, and alternatively additional steps may be added to one or more processes as desired. As one non-limiting example, in some cases, steps 704, 706, and 708 may be omitted from FIG. 6, and the powered system may be disabled based on the powered system having a deactivated status for the predetermined time period. Conversely, blocks 712 and 714 may be omitted from FIG. 6, and the powered system may be disabled based on the deactivated communication status for the predetermined time period. In other embodiments, the predetermined time periods of blocks 706 and/or 712 may be omitted as desired. As a further example, in FIG. 5, the steps of determining the location of the powered system (block 604), determining whether the powered system is within a predetermined distance (block 608), and/or determining if the powered system is in a scheduled interlock (block 612) may optionally be omitted. These modifications are provided only as non-limiting examples, and it will be appreciated that various other modifications to the processes and/or system may be realized.

Figure 11:
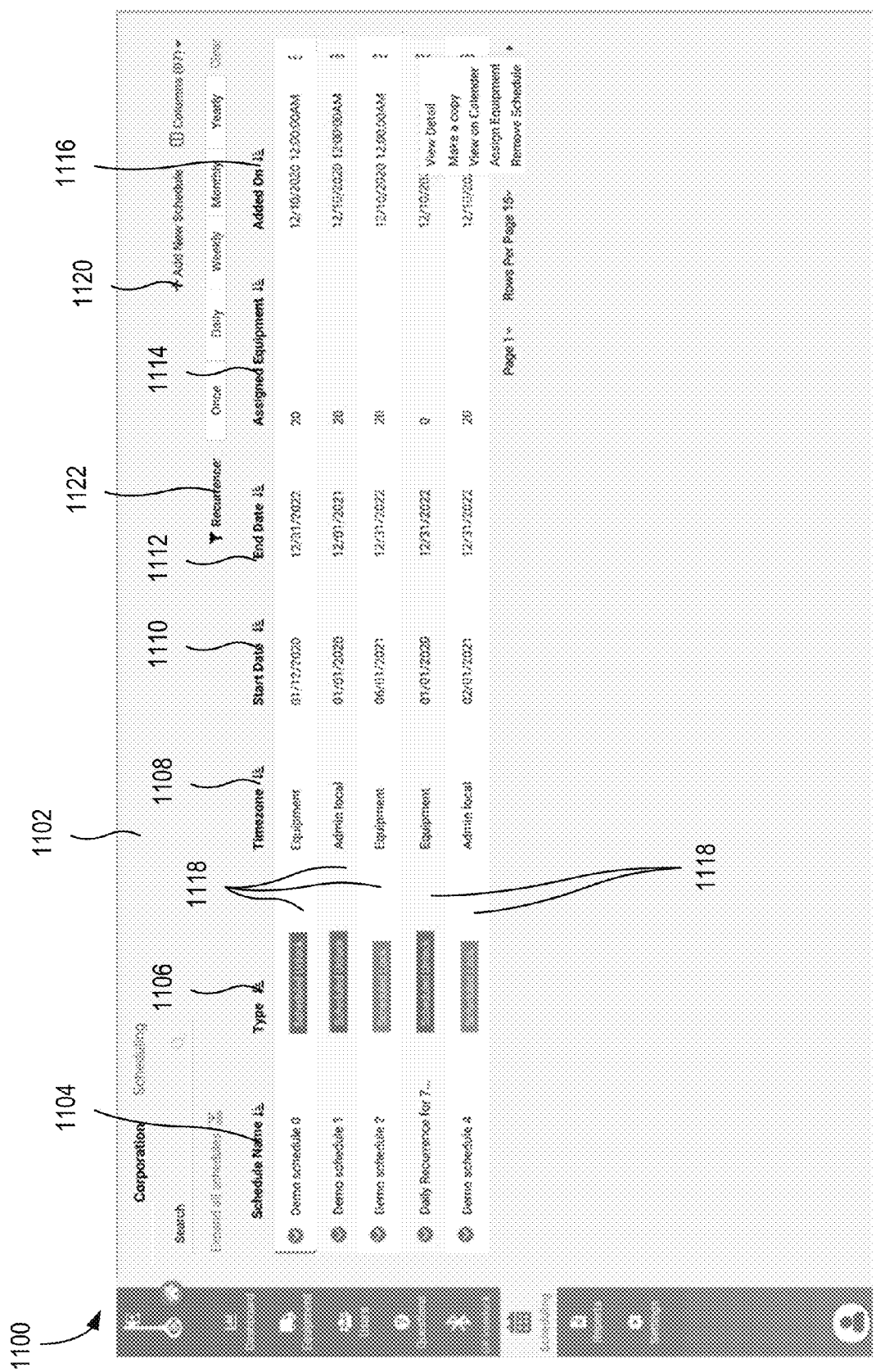
FIG. 11 illustrates a user interface of a scheduling module according to various embodiments.

FIG. 11 illustrates a non-limiting example of a graphical user interface 1102 for a scheduling module 1100 according to various embodiments. The scheduling module 1100 may have an associated processor and/or memory, although in other embodiments the scheduling module 1100 may be provided with a processor and/or memory of another component. The scheduling module 1100 may be used with and/or may be a component of the safety systems described herein, although in other embodiments the scheduling module 1102 need not be used with the safety systems described herein. When included with the safety systems 100, the scheduling module 1100 may be provided with various components, including but not limited to the control system 102, the interlock device 104, the powered system 106, and/or the access device 108. In certain embodiments, the user interface 1102 may be generated and/or provided by a control system and/or a control device. In certain examples, the user interface 1102 may be provided by the control system 102, although it need not in other embodiments. The user interface 1102 may be displayed on various display devices as desired, including but not limited to the access device 108, a display of the powered system 106, a display of the interlock device 104, and/or other devices as desired (e.g., computer monitor, television, etc.). The user interface 1102 may provide controls that enable the user to perform various control operations, including but not limited to creating a schedule. As some non-limiting examples, the user interface 1102 may allow for a user to create, view, assign, remove, and/or copy schedules saved in the system.

In certain embodiments, the user interface 1102 provides indicators about one or more existing schedules 1118 that are within the system. In FIG. 11, the user interface 1102 provides indicators for five existing schedules 1118. Optionally, the indicators may be sorted and/or filtered based on various features discussed herein as well as other features as desired. In some cases, a schedule name 1104 is provided for each existing schedule. Other indicators may include, but are not limited to a type 1106 of schedule for each existing schedule 1118, a timezone 1108 for each existing schedule 1118, a start date 1110 for each existing schedule 1118, an end date 1112 for each existing schedule 1118, powered system identifications 1114 for each existing schedule 1118, and/or historical data 1116 for each existing schedule 1118. As some non-limiting examples, when the scheduling module 1100 is used with the safety system 100, the type 1106 may include a scheduled lock (e.g., the default status of the powered system is unlocked) or a scheduled unlock (e.g., the default status of the powered system is locked), and the powered system identifications 1114 may indicate the number and/or particular powered systems that are controlled by the particular schedule 1118. In certain embodiments, the type 1106 may have a visual indicator depending on the type of event. As a non-limiting embodiment, in FIG. 11, the scheduled unlocks are highlighted green and the scheduled locks are highlighted red. Various other colors may be utilized and/or various other types of visual indicators may be utilized. In certain cases, once a schedule's end date 1112 has elapsed, the scheduling module 1100 may assign the schedule an expired status and may remove the schedule from the system.

In some non-limiting examples, the user interface 1102 may additionally or alternatively provide a status of one or more existing schedules 1118. As an example, the status of one or more existing schedules may be active status or inactive status, where the inactive status may be shown against schedules that are currently not activated on any equipment and the active status may be shown against schedules that are currently applied on equipment. In the embodiment of FIG. 11, the scheduling module 1100 is included with the safety system 100, and the user interface 1102 may include selectable icons 1120 providing access to other user interfaces of the safety system 100, including but not limited to those associated with users, equipment, questions, the interlock devices, reports, and/or various settings as desired.

In various embodiments, the scheduling module 1100 may provide an indicator about all schedules that are assigned to a particular user, a particular piece of equipment, etc. Optionally, the scheduling module 1100 may allow the user to un-assign a schedule from a user, equipment, etc. as desired. Optionally, the scheduling module 1100 may allow for the user to make a copy of an existing schedule. Optionally, the user interface 1102 includes a selectable feature 1120 enabling the user to generate a new schedule as will be discussed in detail below. Optionally, the user interface 1102 includes a filtering feature 1122 enabling the user to filter and/or sort the schedules 1118 based on a recurrence type. In other embodiments, the user interface 1102 may include a subset of these indicators, alternative indicators, and/or additional indicators as desired. Likewise, additional, fewer, or different indicators may be included if the scheduling module 1100 is included with the safety system 100 and/or other systems as desired.

Figure 12:
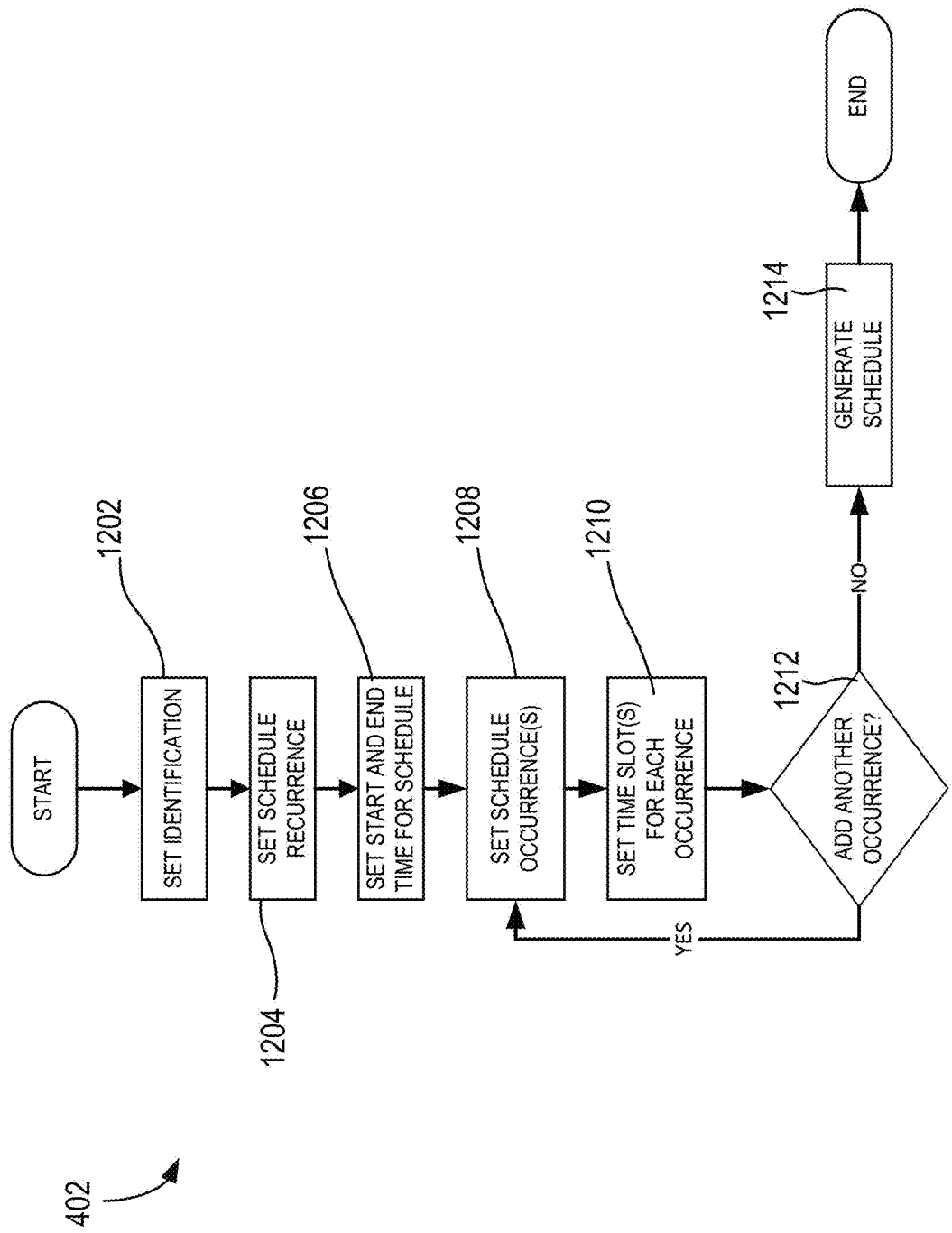
FIG. 12 is a flow chart of a scheduling process according to various embodiments.

FIG. 12 illustrates an example of the scheduling process 402 with the scheduling module 1100 described herein.

In block 1202, the process includes setting an identification of the desired schedule. In certain embodiments, block 1202 may include setting the desired schedule with a schedule name. In some embodiments, each schedule is provided with a unique name, and the scheduling module 1100 may prevent the unique name from being assigned to another schedule (or at least until the schedule with the particular name is removed from the system). As a non-limiting example, if a user names a schedule as "Weekend," then no other schedule with the name "Weekend" can exist in the system until the schedule is removed from the system. As another non-limiting example, if a user names the schedule as "Off-Shift Weekday" but a schedule already exists within the system with the name "Off-Shift Weekday", the system will give an error and not allow the user to use the identifier "Off-Shift Weekday". Optionally, setting the identification of the desired schedule may include setting a type of schedule. As some non-limiting examples, the type of schedule may be a "scheduled lock" or a "scheduled unlock." Other types of schedules may be utilized or set as desired.

In block 1204, the process includes setting a recurrence of the overall schedule. In various embodiments, the schedule may be set with one recurrence (e.g., the schedule is a one-time event) or more than one recurrence. As some non-limiting examples where the schedule has more than one recurrence, the recurrence may be a daily recurrence (e.g., repeat the schedule every X number of days), a weekly recurrence (e.g., repeat the schedule every X number of weeks), a monthly recurrence (e.g., repeat the schedule every X number of months), a yearly recurrence (e.g., repeat the schedule every X number of years), or otherwise as desired. In certain embodiments, each of the recurrences may have a default of one (e.g., a daily recurrence has a default of repeating every day), although in other embodiments the interval or frequency of the recurrence need not be one. As a non-limiting example, a daily recurrence may be set to repeat every three days, a weekly recurrence may be set to repeat every two weeks, and/or a monthly recurrence may be set to repeat every five months.

In block 1206, the process includes setting a start time and an end time for the overall schedule. In certain embodiments, the start time and the end time may be on the same date (which may effectively make the schedule a single or one-time recurrence) or on different dates. In embodiments where the start time and the end time are on different dates, the recurrence may be a one-time recurrence or a plurality of recurrences.

In block 1208, the process includes setting one or more occurrences of the schedule within one recurrence. As a non-limiting example, if a schedule is set with a weekly recurrence in block 1204, the occurrences of the schedule within a single week are set in block 1208. In various embodiments, the start time of an occurrence cannot be prior to the schedule's start time set in block 1206; however, the end time of an occurrence may or may not be after the schedule's end time (i.e., the occurrence's end time is prioritized over the schedule's end time, and the process effectively ignores the schedule's end time).

In certain embodiments, the occurrence may be a specific occurrence or a type occurrence. In various embodiments, the specific occurrence may be one or more specific days within one recurrence. As a non-limiting example, if a schedule set with a monthly recurrence in block 1204, specific occurrences of the schedule in block 1208 may be set for one or more specific days (e.g., days 1-31) within one or more specific months (e.g., January, February, March, etc.). In various embodiments, the type occurrence may be one or more types of days within one recurrence. As a non-limiting example, if a schedule is set with a monthly recurrence in block 1204, type occurrences of the schedule in block 1208 may be set for one or more types of days (e.g., first, second, third, fourth, last, full, etc) within one or more specific months (e.g., January, February, March, etc.). Non-limiting examples of type occurrences within one recurrence may include the first Monday and the first Thursday in January, the first Tuesday and the second Wednesday in August, the third Friday in May, the second and fourth Sunday in February and April, the last Saturday in June, July and August, the last full weekend of each month, etc.

In block 1210, the process includes setting one or more time slots for each occurrence. In certain embodiments, the time slots may be an all day time slot, a continuous hours time slot, or a segmented time slot.

In various embodiments, the all day time slot sets the schedule for the complete day for the particular occurrence set in block 1208. As a non-limiting example, if a schedule is set with a weekly recurrence in block 1204 and a specific occurrence of Monday and Friday in block 1208, an all day time slot in block 1210 would set the schedule for all day Monday and all day Friday.

In certain embodiments, the continuous hours time slot sets the schedule for a continuous duration, which may be predetermined or provided by the user. In various embodiments, the continuous duration may be less than the duration of one day (i.e., less than 24 hours), the duration of one day, or greater than the duration of one day. As some non-limiting examples, the duration may be 4 hours, 9 hours, 48 hours, 90 hours, or otherwise as desired. In embodiments where the duration of the continuous hours time slot is greater than the duration of one day, the start time of the occurrence will be on the selected day(s) and the end time of the occurrence will be at the end of the duration on a later day, even though the later day was not specifically identified in block 1208. As a non-limiting example, if a schedule is set with a weekly recurrence in block 1204 and the occurrences of the schedule are set to Monday and Friday in block 1208, a continuous hours time slot selection in block 1210 for a duration of 36 hours would have the schedule run for 36 hours on each of Monday and Friday. In this embodiment, the occurrence starting on Monday would not end until midday Tuesday, and the occurrence starting on Friday would not end until midday Saturday. In some embodiments, the continuous hours time slot may be set with a time range. As a non-limiting example, the time range for the continuous hours time slot may be from 12:00 AM to 6:30 PM.

In some embodiments, the segmented time slot sets one or more segments, each having a start time and a stop time, against the same date. In various embodiments, when a plurality of segments are set against a single date, the segments may optionally be disconnected or discontinuous. In other words, a start time and an end time of a first segment may be disconnected and not overlap with a start time and an end time of a second segment. As a non-limiting example, if a schedule is set with a weekly recurrence in block 1204 and the occurrences of the schedule are set to Monday and Friday in block 1208, a segmented time slot selection in block 1210 may set a first segment to be from 6:00 AM to 9:00 AM and a second segment to be from 3:00 PM to 10:00 PM As illustrated, the second segment is disconnected or discontinuous with the first segment. In this embodiment, the occurrence on each of Monday and Friday would be from 6:00 AM to 9:00 AM and from 3:00 PM to 10:00 PM. As illustrated by this example, and as discussed in detail below, the scheduling module provided herein may allow for the schedule to be discontinuous or disconnected both on an occurrence level and a time slot level. Such discontinuous or disconnected scheduling may provide improved flexibility for a schedule to be set without requiring a separate schedule to be created as has traditionally be required.

In block 1212, the process includes determining whether another occurrence should be added. If another occurrence should be added, the process returns to block 1208. If another occurrence does not need to be added, the process proceeds to block 1214. Blocks 1208-1212 may be repeated as desired (e.g., based on a desired number of occurrences and/or time slots). In various embodiments, when more than one occurrence is set within one recurrence, the occurrences and/or time slots of one occurrence may be the same as or different from the occurrence and/or time slots of another occurrence. As a non-limiting example, a schedule may be set with a monthly recurrence in block 1204. In this example, a first occurrence may be set in block 1208 as a specific occurrence on the $21^{st}$ of each month, and the time slot for this first occurrence may be set to an all day time slot in block 1210. A second occurrence may be set in block 1210 as a type occurrence on the third Wednesday of each month, and the time slot for this second occurrence may be set to segmented time slots from 6:00 AM to 7:00 AM and 3:00 PM to 4:00 PM.

In block 1214, the process includes generating the schedule having the start time and end time as set in block 1206 and with the recurrence as set in block 1204, where each recurrence of the schedule has one or more occurrences with one or more time slots as set in blocks 1208 and 1210. In certain embodiments, block 1214 may include assigning the schedule to one or more user identifications, one or more powered systems, one or more pieces of equipment (e.g., not necessarily powered), one or more test questions, combinations thereof, or otherwise as desired. In some embodiments, block 1214 may automatically assign the generated schedule to the user, equipment, or otherwise after it is generated, while in other embodiments the generated schedule may be saved by the scheduling module 1100 and may be assigned later. In certain embodiments, generating the schedule may include determining a pairing between the event identification and one or more controllable identifications (e.g., a user, a piece of equipment, an interlock, etc.) and generating the schedule based on the pairing. In certain embodiments, determining the pairing may optionally include comparing the event identification with one or more features of the controllable identifications, including but not limited to a unique identification, a class type, a type of equipment, a credential, a license, etc. as desired. In various embodiments, generating the schedule may include displaying the schedule on a graphical user interface (which may be, but does not have to be, on an access device, the interlock device, the powered system, and/or other locations as desired).

In various embodiments, block 1214 may include determining if a particular user, equipment, powered system, etc. is assigned to two or more schedules. In these embodiments, the process may include determining whether the two or more schedules have an overlapping time schedule and merging the overlapping schedules. In some embodiments, when the two or more schedules are different or conflicting schedule types (e.g., scheduled lock vs. scheduled unlock), the last-assigned schedule will have a precedence in the case of overlapping schedules. As a non-limiting example, Schedule A is a weekly schedule that unlocks a piece of equipment only on Thursdays from 6:00 PM to 7:00 PM, and Schedule B is a daily schedule that locks the equipment from 5.00 PM to 12:00 AM. Schedule A is also the last or latest-assigned schedule. In this embodiment, on Thursday, the system will lock the equipment from 5:00 PM to 6:00 PM (pursuant to Schedule B) and unlock it from 6:00 PM to 7:00 PM (pursuant to Schedule A) and then would again lock the equipment from 7:00 PM to 12:00 AM (pursuant to schedule 13), and for the rest of the days of the week, only Schedule B will run from 5:00 PM to 12:00 AM.

In certain embodiments, in block 1214 the process may include determining whether the two or more schedules have an overlapping time schedule and a same or overlapping schedule type, and merging the overlapping schedules. As a non-limiting example, Schedule A is a weekly schedule that locks Equipment A only on Mondays from 6:00 AM to 9.00 AM, and Schedule B is a daily schedule that locks Equipment A from 3:00 PM to 6:00 PM. In this embodiment, because both Schedule A and Schedule B are the same schedule type (i.e., a scheduled lock), the system merges the schedules and applies a resultant schedule, Schedule AB, on Equipment A that locks Equipment A every Monday from 6:00 AM to 9.00 AM and 3:00 PM to 6:00 PM and every other day from 3:00 PM to 6:00 PM. To further expand this non-limiting example, a Schedule C that is a weekly schedule that locks Equipment A only on Thursdays for 25 hours may be applied to Equipment A. In this embodiment, because Schedule AB and Schedule C are the same schedule type (i.e., a scheduled lock), the system merges the schedules and applies a resultant schedule, Schedule ABC, on Equipment A that locks Equipment A every Monday from 6:00 AM to 9:00 AM (pursuant to original Schedule A), all day Thursday (accounting for 24 of the 25 hours pursuant to original Schedule C), every Friday from 12:00 AM to 1:00 AM (accounting for the last hour of the 25 hours pursuant to original Schedule C) and from 3:00 PM to 6:00 PM (pursuant to original Schedule B), and every other day from 3:00 PM to 6:00 PM (pursuant to original Schedule B). If the user removes or un-assigns one of the overlapping schedules, the system likewise removes the schedule from the resulting schedule. For example, in the prior non-limiting example, if the user removes Schedule C from Equipment A, the system applies Schedule AB on Equipment A.

In certain embodiments, in block 1214 the process may include determining whether the two or more schedules overlap completely, overlapping time schedule and a same or overlapping schedule type, and merging the overlapping schedules. In this embodiment, the last-assigned schedule may take precedence. As a non-limiting example, Schedule A is assigned to Equipment A. and Schedule B is assigned to Equipment A at a later date but completely overlaps Schedule A. In this example, the system applies Schedule B on Equipment A (as the last-assigned schedule). Optionally, if the Schedule B is removed from Equipment A, the system would apply Schedule A on Equipment A for the remaining interval of time.

Figure 15:
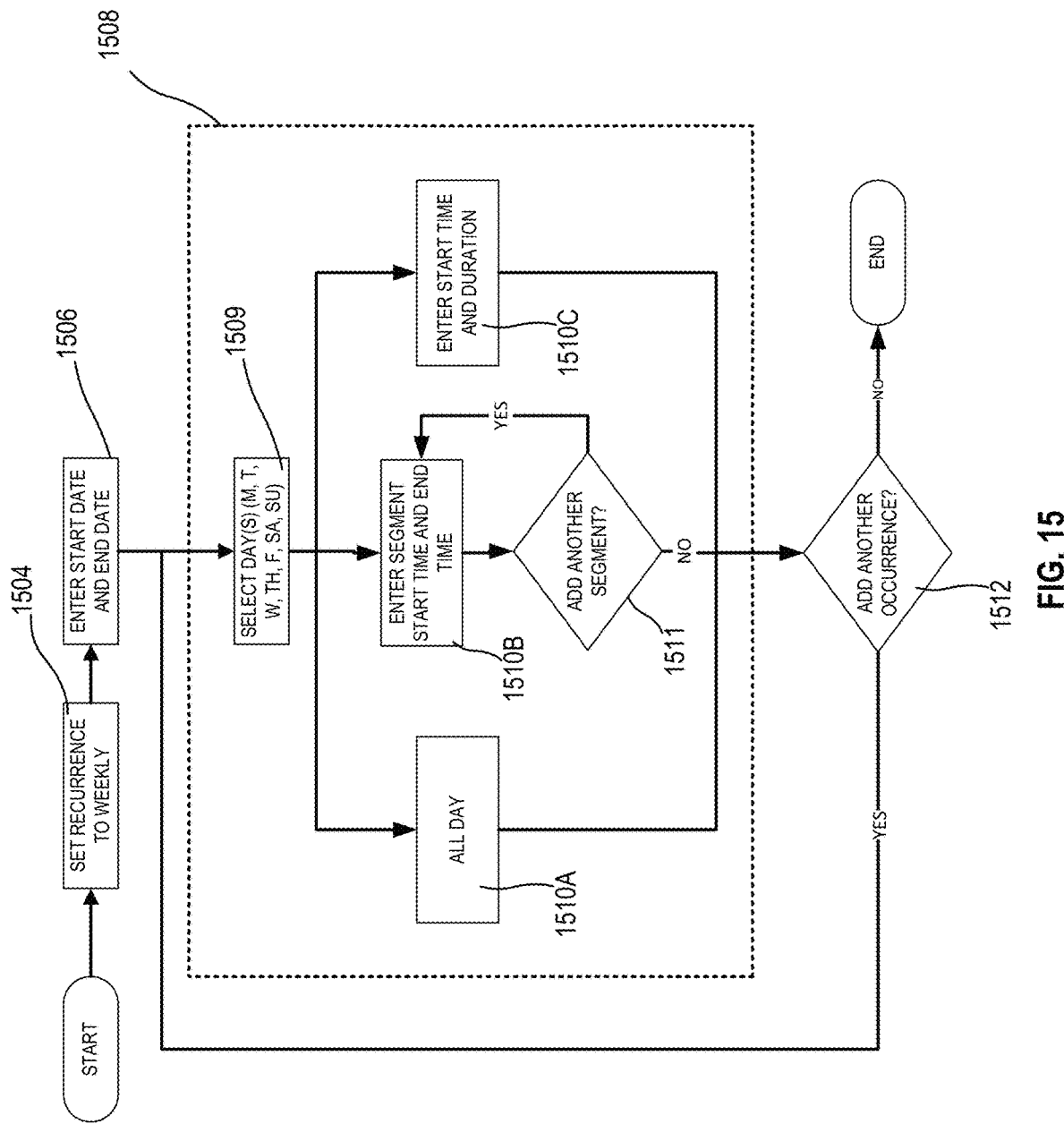
FIG. 15 is a flow chart of a scheduling process with a weekly recurrence according to various embodiments.
Figure 16A:
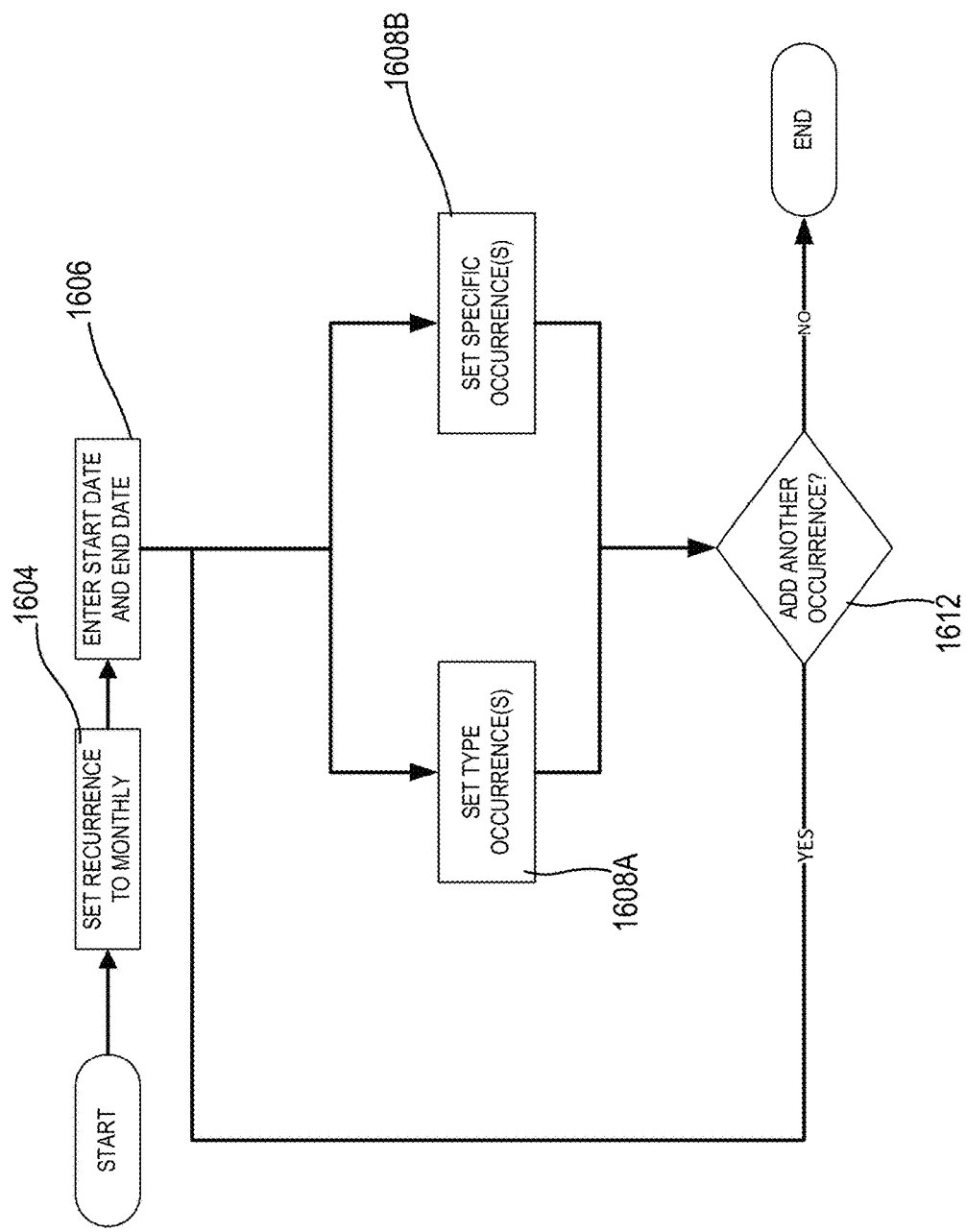
FIGS. 16A-C are flow charts of a scheduling process with a monthly recurrence according to various embodiments.
Figure 16B:
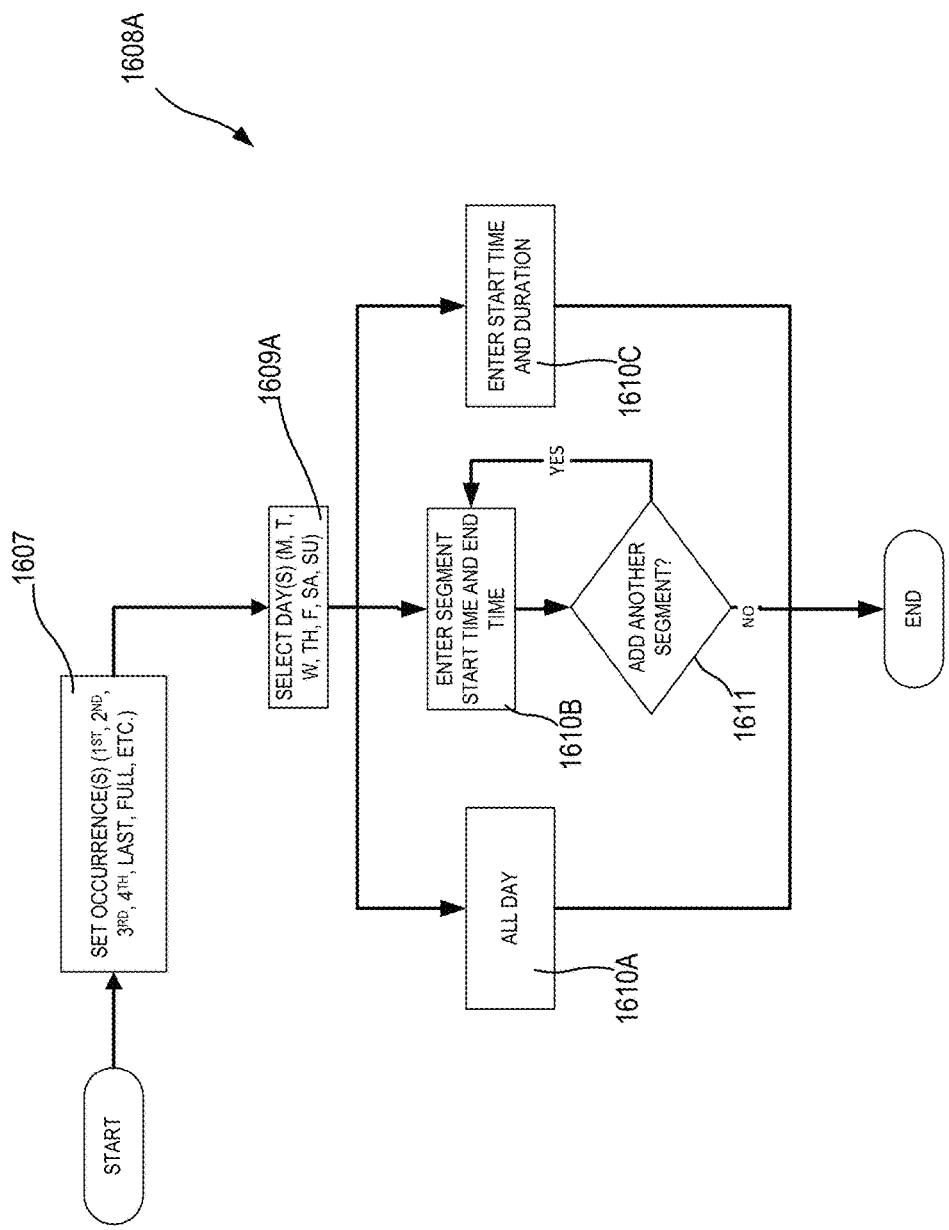
Figure 16C:
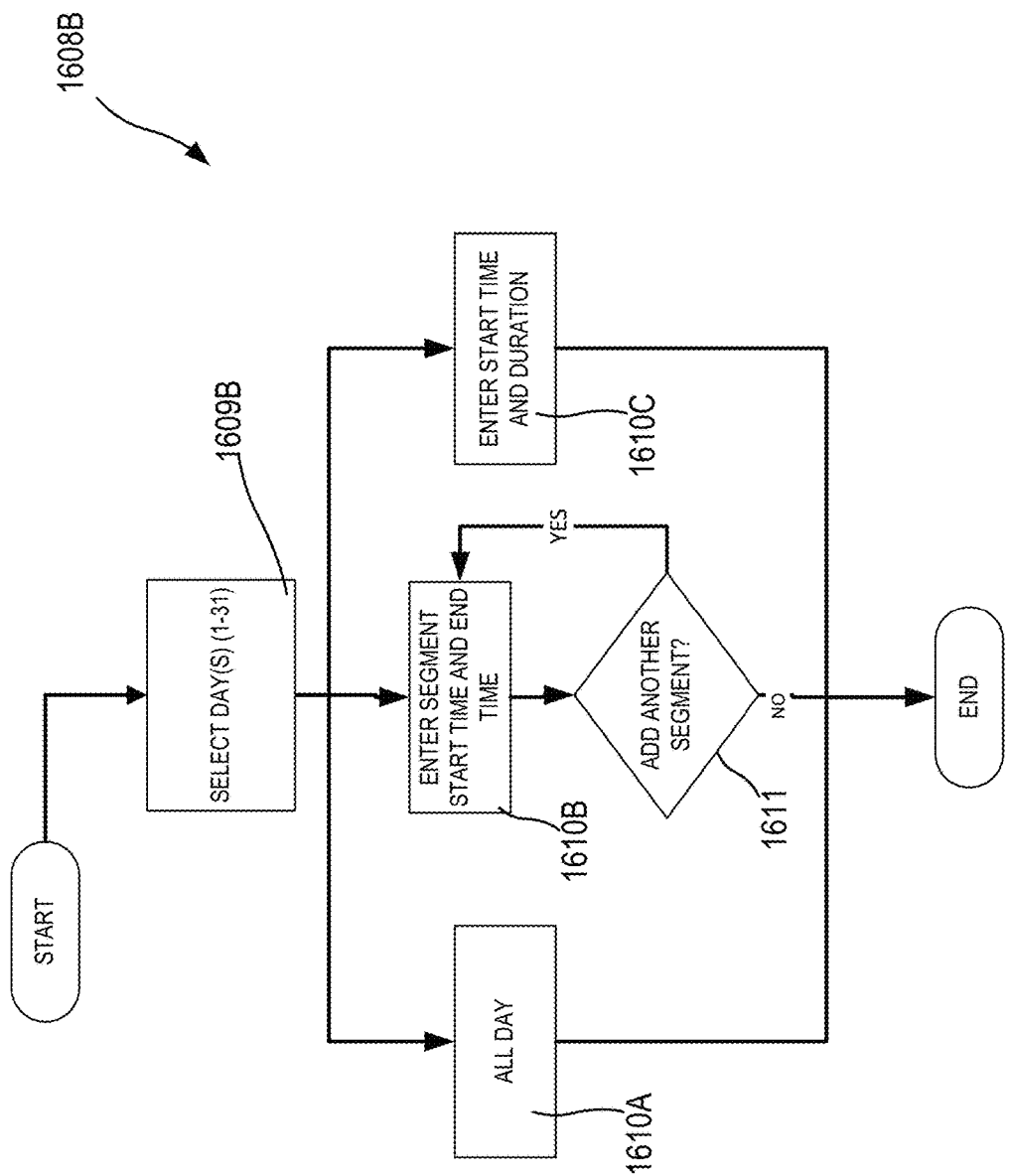
Figure 17A:
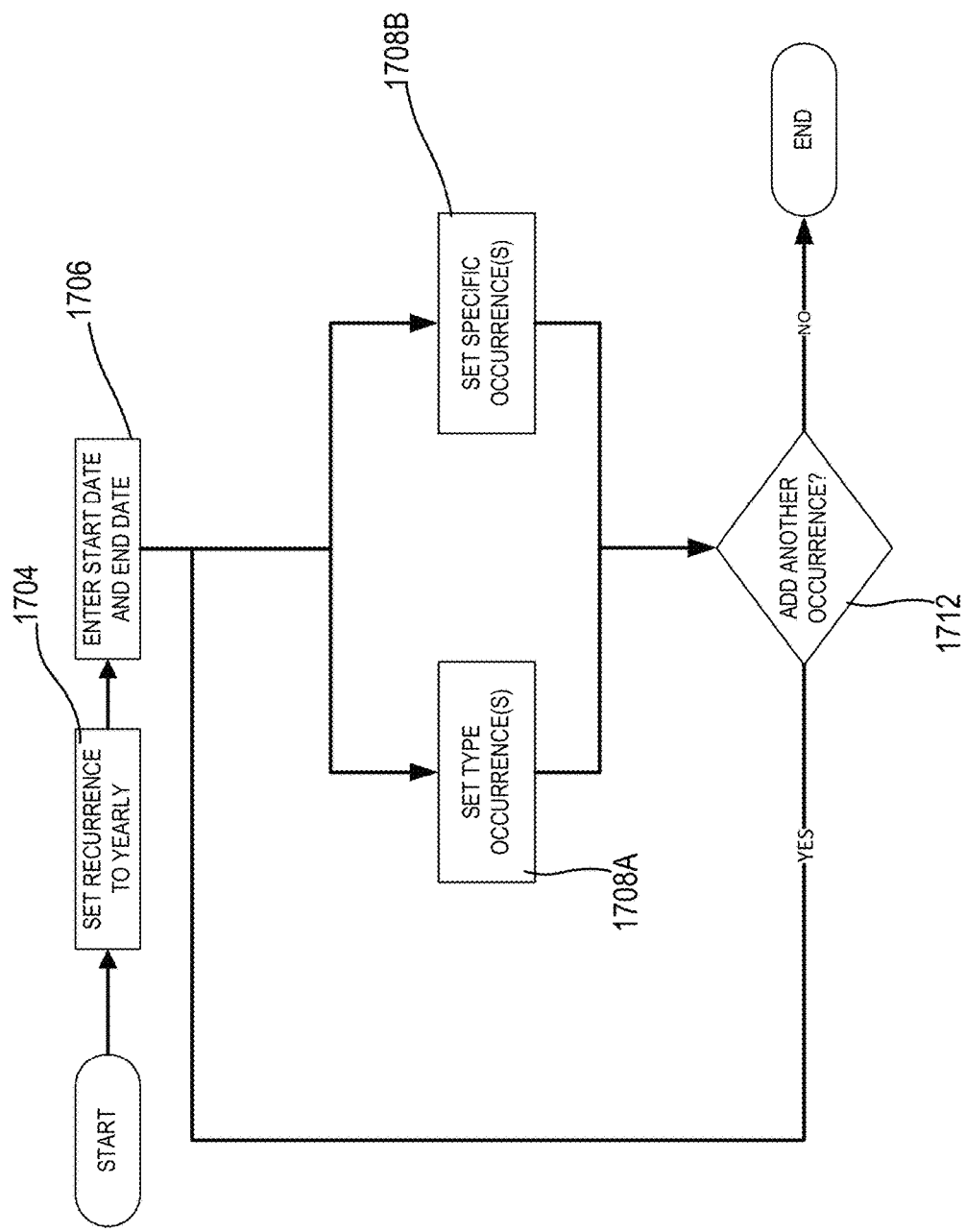
FIGS. 17A-C are flow charts of a scheduling process with a yearly recurrence according to various embodiments.
Figure 17B:
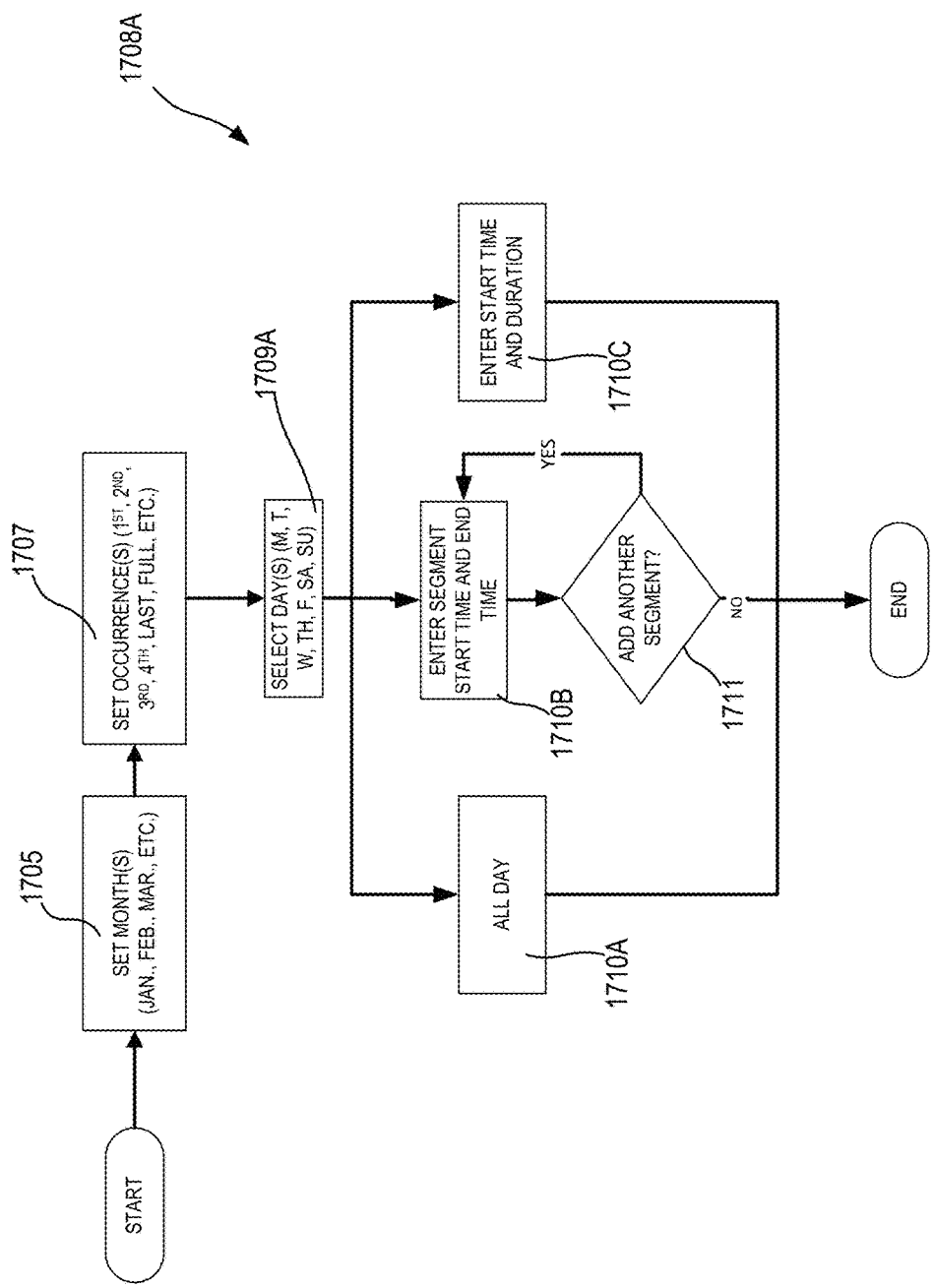
Figure 17C:
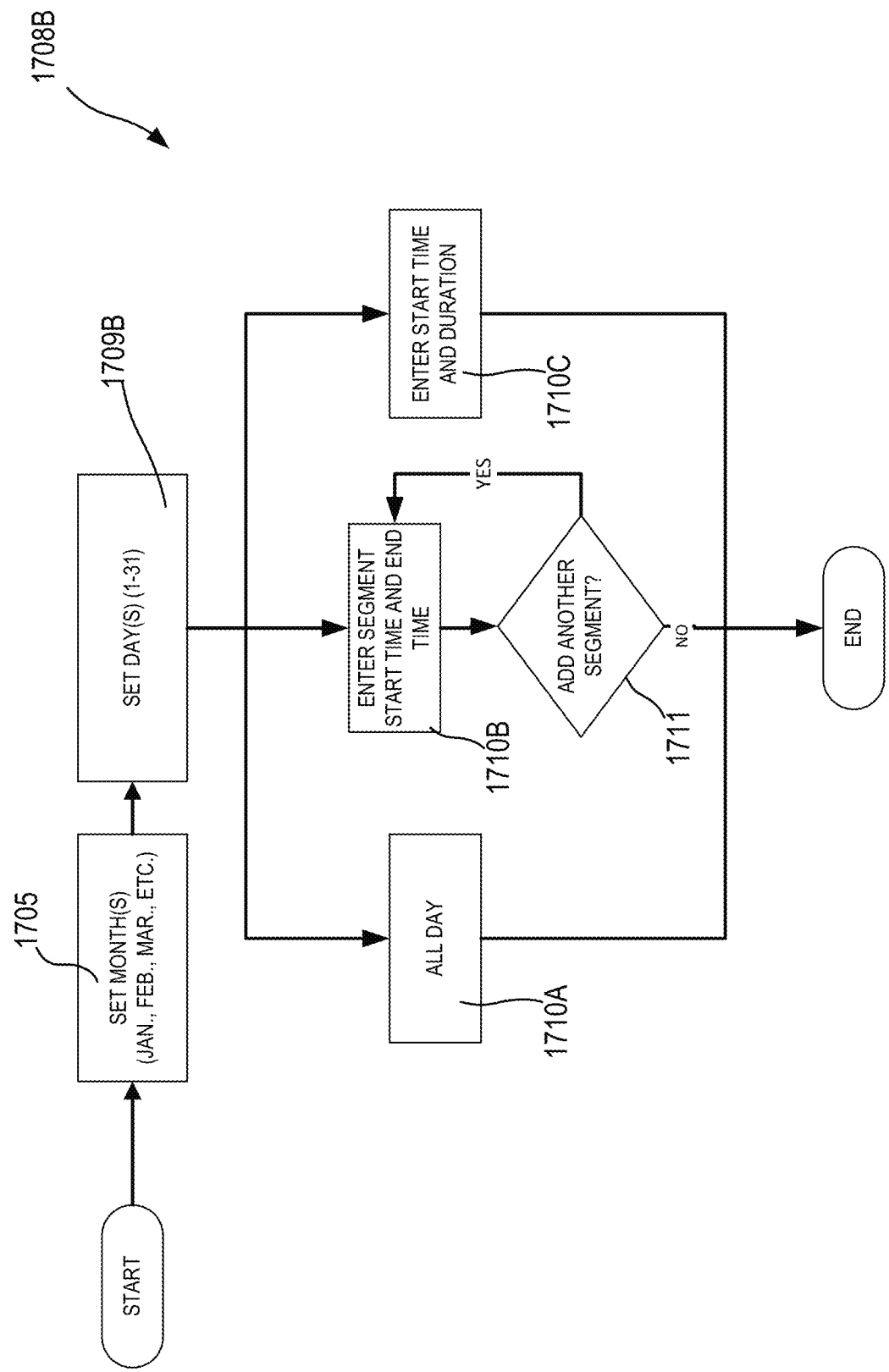

FIGS. 13-17C illustrate non-limiting examples of steps 1204-1212 for generating a schedule with a single recurrence (FIG. 13), a daily recurrence (FIG. 14), a weekly recurrence (FIG. 15), a monthly recurrence (FIGS. 16A-C), and a yearly recurrence (FIG. 17A-C).

Figure 13:
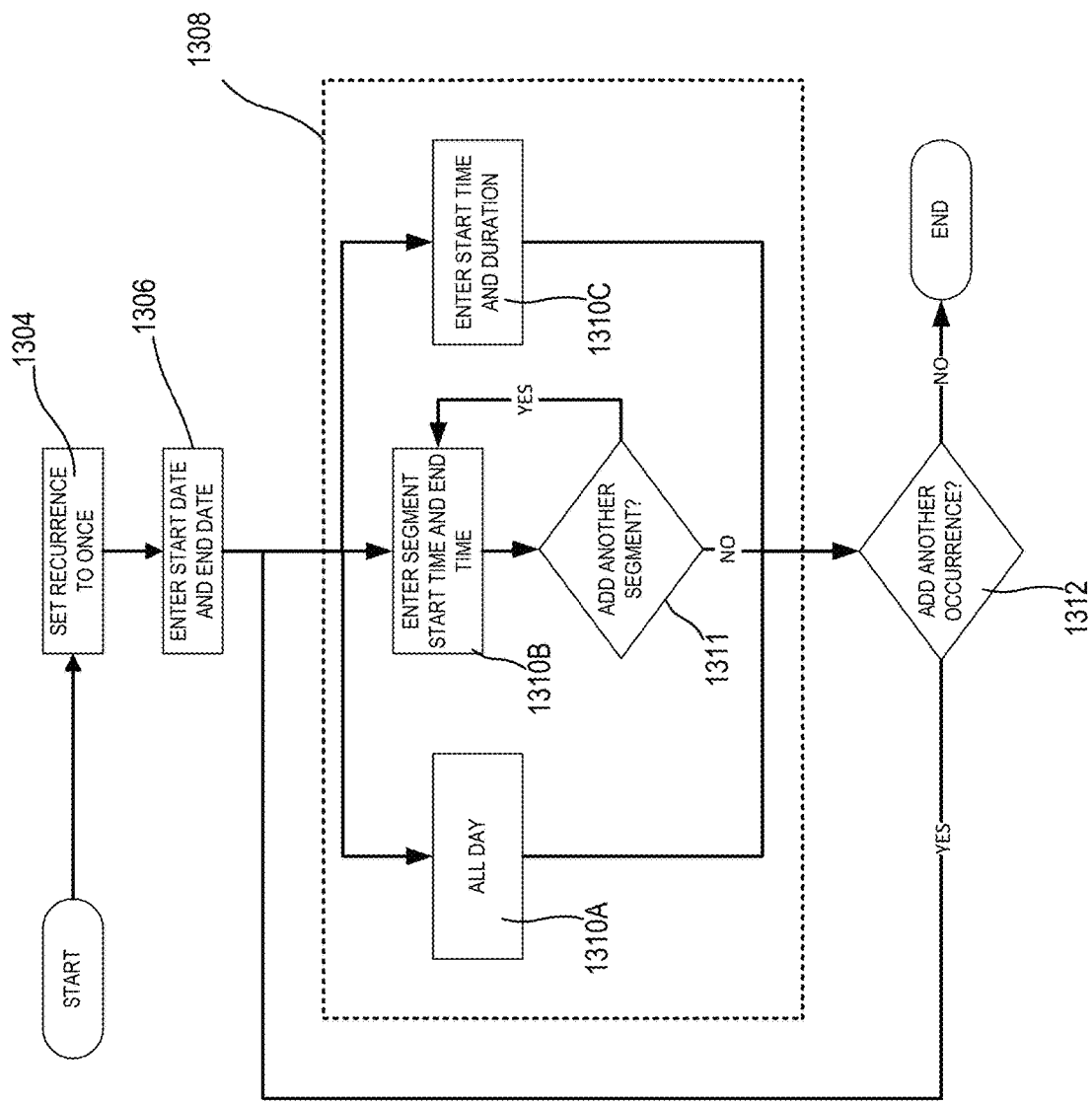
FIG. 13 is a flow chart of a scheduling process with a single recurrence according to various embodiments.

Referring to FIG. 13, block 1304 corresponds to block 1204, and the recurrence of the schedule is set to once. Block 1306 corresponds to block 1206, and the start date and the end date of the schedule are set. Block 1308 corresponds to block 1208, and each desired occurrence of the schedule is set in block 1308. Blocks 1310A-C correspond to the specific time slots previously discussed in the context of block 1210. In particular, the schedule may be set with an all day time slot (block 1310A), a segmented time slot (block 1310B), or a continuous time slot (block 1310C). In various embodiments, the if occurrence is set to the segmented time slot, after setting a first segment start time and end time in block 1310B, the process may include block 1311, which determines whether additional segments should be added. Block 1312 generally corresponds with block 1212. As illustrated in FIG. 13, a schedule set with a single recurrence may optionally have one or more occurrences (which may or may not be disconnected from each other), and each occurrence may optionally have one or more time slots (which may or may not be disconnected from each other).

Figure 14:
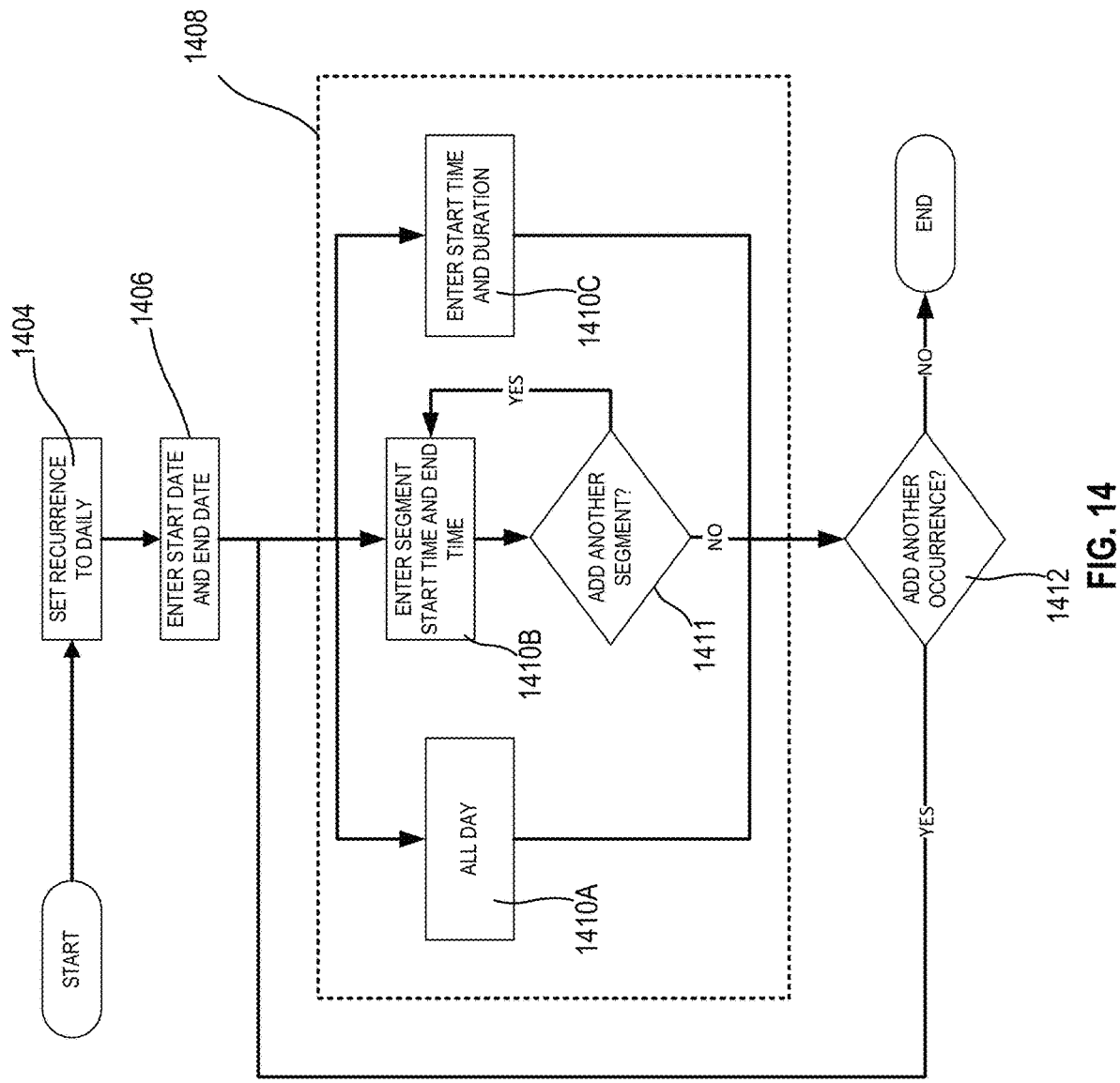
FIG. 14 is a flow chart of a scheduling process with a daily recurrence according to various embodiments.

Referring to FIG. 14, block 1404 corresponds to block 1204, and the recurrence of the schedule is set to daily (e.g., repeat every day). Block 1406 corresponds to block 1206, and the start date and the end date of the schedule are set. Block 1408 corresponds to block 1208, and each desired occurrence of the schedule is set in block 1408. Blocks 1410A-C correspond to the specific time slots previously discussed in the context of block 1210. In particular, the schedule may be set with an all day time slot (block 1410A), a segmented time slot (block 1410B), or a continuous time slot (block 1410C) In various embodiments, the if occurrence is set to the segmented time slot, after setting a first segment start time and end time in block 1410B, the process may include block 1411, which determines whether additional segments should be added. Block 1412 generally corresponds with block 1212 and may allow for additional occurrences of the schedule within one recurrence to be added as desired. As illustrated in FIG. 14, a schedule set with a daily recurrence may optionally have one or more occurrences (which may or may not be disconnected from each other), and each occurrence may optionally have one or more time slots (which may or may not be disconnected from each other).

Referring to FIG. 15, block 1504 corresponds to block 1204, and the recurrence of the schedule is set to weekly (e.g., repeat every week). Block 1506 corresponds to block 1206, and the start date and the end date of the schedule are set. Block 1508 corresponds to block 1208, and each desired occurrence of the schedule is set in block 1508. Similar to FIGS. 13 and 14, blocks 1510A-C correspond to the specific time slots previously discussed in the context of block 1210. In particular, the schedule may be set with an all day time slot (block 1510A), a segmented time slot (block 1510B), or a continuous time slot (block 1510C). In various embodiments, the if occurrence is set to the segmented time slot, after setting a first segment start time and end time in block 1510B, the process may include block 1511, which determines whether additional segments should be added. Compared to FIGS. 13 and 14, when the recurrence of the schedule is set to weekly, block 1508 additionally includes the sub-block 1509 in which the process sets one or more days for each occurrence (e.g., Monday (M), Tuesday (T), Wednesday (W), Thursday (TH), Friday (F), Saturday (SA), and/or Sunday (SU)). In block 1509, a single day may be selected or a plurality of days may be selected. When a plurality of days are selected in block 1509, the days may be continuous or disconnected as desired. Block 1512 generally corresponds with block 1212 and may allow for additional occurrences of the schedule within one recurrence to be added as desired. As illustrated in FIG. 15, a schedule set with a weekly recurrence may optionally have one or more occurrences (which may or may not be disconnected from each other), and each occurrence may optionally have one or more days (which may or may not be disconnected from each other) and one or more time slots (which may or may not be disconnected from each other).

Referring to FIG. 16A, block 1604 corresponds to block 1204, and the recurrence of the schedule is set to monthly (e.g., repeat every month). Block 1606 corresponds to block 1206, and the start date and the end date of the schedule are set Compared to FIGS. 13-15, when the recurrence of the schedule is set to monthly, the process optionally includes setting one or more type occurrences in block 1608A (see FIG. 16B) and/or one or more specific occurrences in block 1608B (see FIG. 16C). Block 1612 generally corresponds with block 1212 and may allow for additional occurrences (type and/or specific) of the schedule within one recurrence to be added as desired.

FIG. 16B illustrates a non-limiting example of a process for setting a type occurrence in greater detail. As illustrated in FIG. 16B, in a block 1607, the process may include setting one or more types of days for the particular occurrence. Non-limiting examples of types of occurrences that may be set in block 1607 include, but are not limited to, first, second, third, fourth, last, full, and/or otherwise as desired. In block 1607, a single type of day may be selected (e.g., second), or a plurality of types of days may be selected (e.g., first and fourth). The process 1608A may include block 1609A in which the process sets one or more days for each occurrence. In block 1609A, a single day may be selected or a plurality of days may be selected. When a plurality of days are selected in block 1609A, the days may be continuous or disconnected as desired. Similar to FIGS. 13-15, blocks 1610A-C correspond to the specific time slots previously discussed in the context of block 1210. In particular, the schedule may be set with an all day time slot (block 1610A), a segmented time slot (block 1610B), or a continuous time slot (block 1610C). In various embodiments, the if occurrence is set to the segmented time slot, after setting a first segment start time and end time in block 1610B, the process may include block 1611, which determines whether additional segments should be added.

FIG. 16C illustrates a non-limiting example of a process for setting a specific occurrence in greater detail. As illustrated in FIG. 16C, in a block 1609B, the process sets one or more days for each occurrence Compared to block 1609A (setting the type of day), block 1609B sets one or more specific days (e.g., days 1-31) within a month. Similar to the process 1608A, the process 1608B optionally includes 1610A-C such that the particular time slots for each occurrence may be set as desired. As illustrated in FIGS. 16A-C, a schedule set with a monthly recurrence may optionally have one or more occurrences (which may or may not be disconnected from each other), one or more types of occurrences (e.g., specific occurrence and/or type occurrence), each occurrence may optionally have one or more days (which may or may not be disconnected from each other) and/or one or more time slots (which may or may not be disconnected from each other).

Referring to FIG. 17A, block 1704 corresponds to block 1204, and the recurrence of the schedule is set to yearly (e.g., repeat every year). Block 1706 corresponds to block 1206, and the start date and the end date of the schedule are set. Similar to setting the monthly recurrence in FIG. 16A, the process setting the yearly recurrence optionally includes setting one or more type occurrences in block 1708A (see FIG. 17B) and/or one or more specific occurrences in block 1708B (see FIG. 17C). Block 1712 generally corresponds with block 1212 and may allow for additional occurrences (type and/or specific) of the schedule within one recurrence to be added as desired.

FIG. 17B illustrates a non-limiting example of a process for setting a type occurrence in greater detail. As illustrated, FIG. 17B is similar to FIG. 16B except that an additional block 1705 is included. In block 1705, the process includes setting one or more months for a particular occurrence (e.g., January (JAN.), February (FEB.), March (MAR.), etc.). A single month may be selected in block 1705 or a plurality of months may be selected. When a plurality of months are selected, they need not be continuous with each other. Block 1707 is substantially similar to block 1607 and includes setting one or more types of days for the particular occurrence. Block 1709A is substantially similar to block 1609A, and the day(s) selected based on blocks 1707 and 1709A will be selected in each of the months selected in block 1705. Blocks 1710A-C and block 1711 are substantially similar to blocks 1610A-C and block 1611, respectively.

FIG. 17C illustrates a non-limiting example of a process for setting a specific occurrence in greater detail. FIG. 17C is substantially similar to FIG. 16C except that FIG. 17C additionally includes block 1705 in which one or more months for a particular occurrence are set. Block 1709B is substantially similar to block 1609B and includes setting one or more specific days, and the day(s) selected based on block 1709B will be selected in each of the months selected in block 1705. Blocks 1710A-C and block 1711 are substantially similar to blocks 1610A-C and block 1611, respectively. As illustrated in FIGS. 17A-C, a schedule set with a yearly recurrence may optionally have one or more occurrences (which may or may not be disconnected from each other), one or more types of occurrences (e.g., specific occurrence and/or type occurrence), each occurrence may optionally have one or more months (which may or may not be disconnected from each other), one or more days (which may or may not be disconnected from each other) and/or one or more time slots (which may or may not be disconnected from each other).

Figure 18:
FIG. 18 illustrates a user interface generating schedule according to various embodiments.
Figure 19:
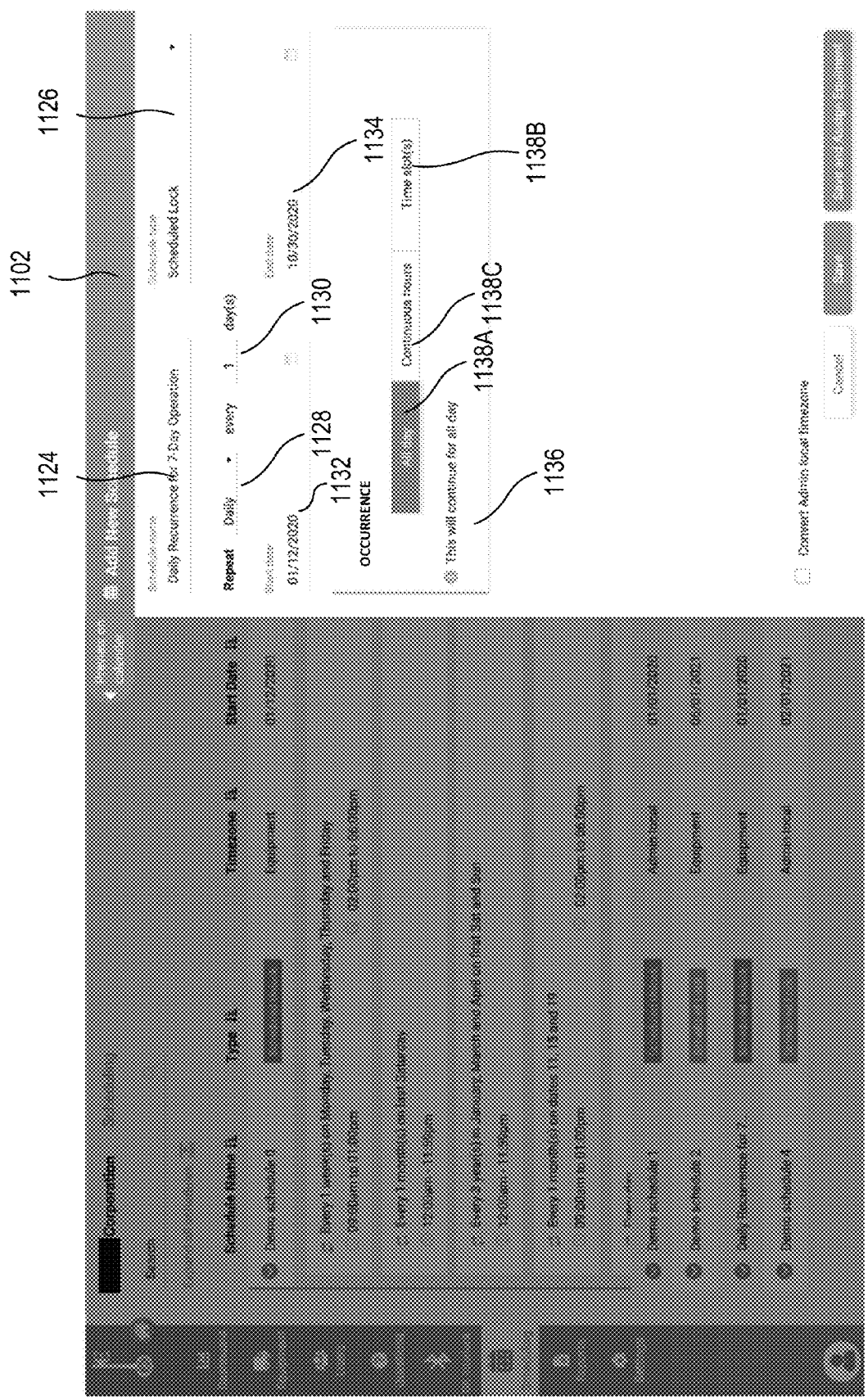
FIG. 19 illustrates a user interface generating another schedule according to various embodiments.
Figure 20:
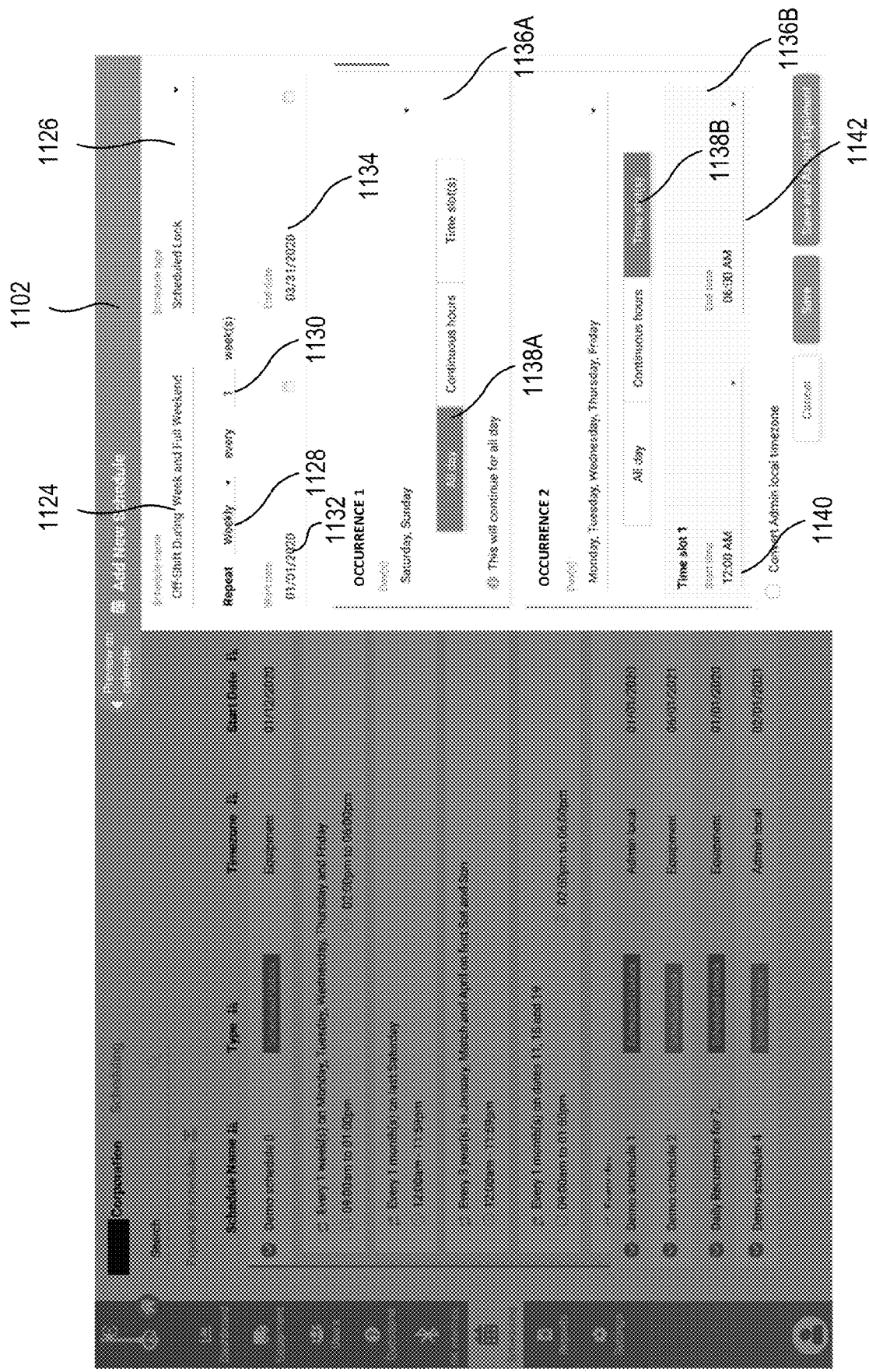
FIG. 20 illustrates a user interface generating another schedule according to various embodiments.
Figure 21:
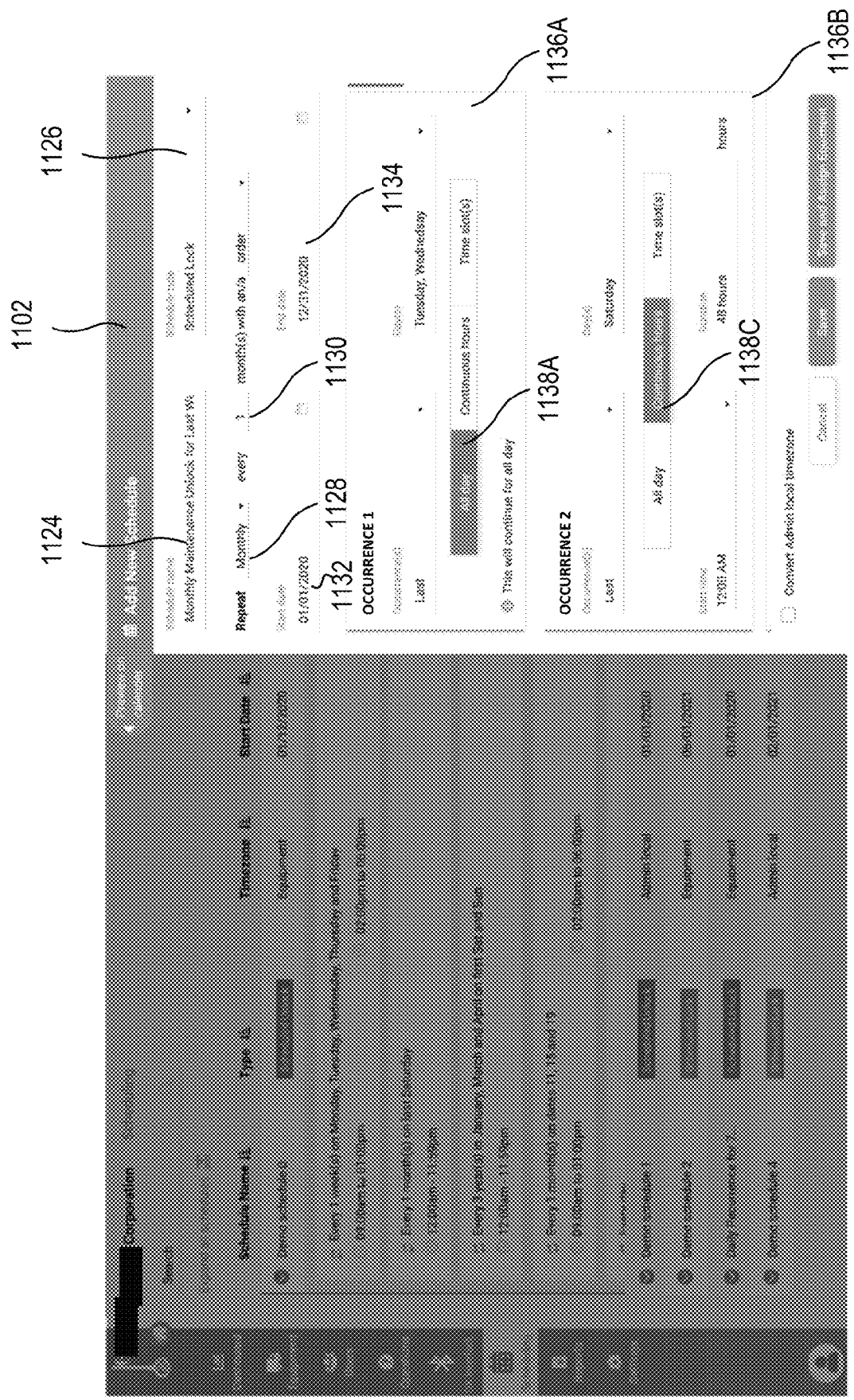
FIG. 21 illustrates a user interface generating another schedule according to various embodiments.
Figure 22:
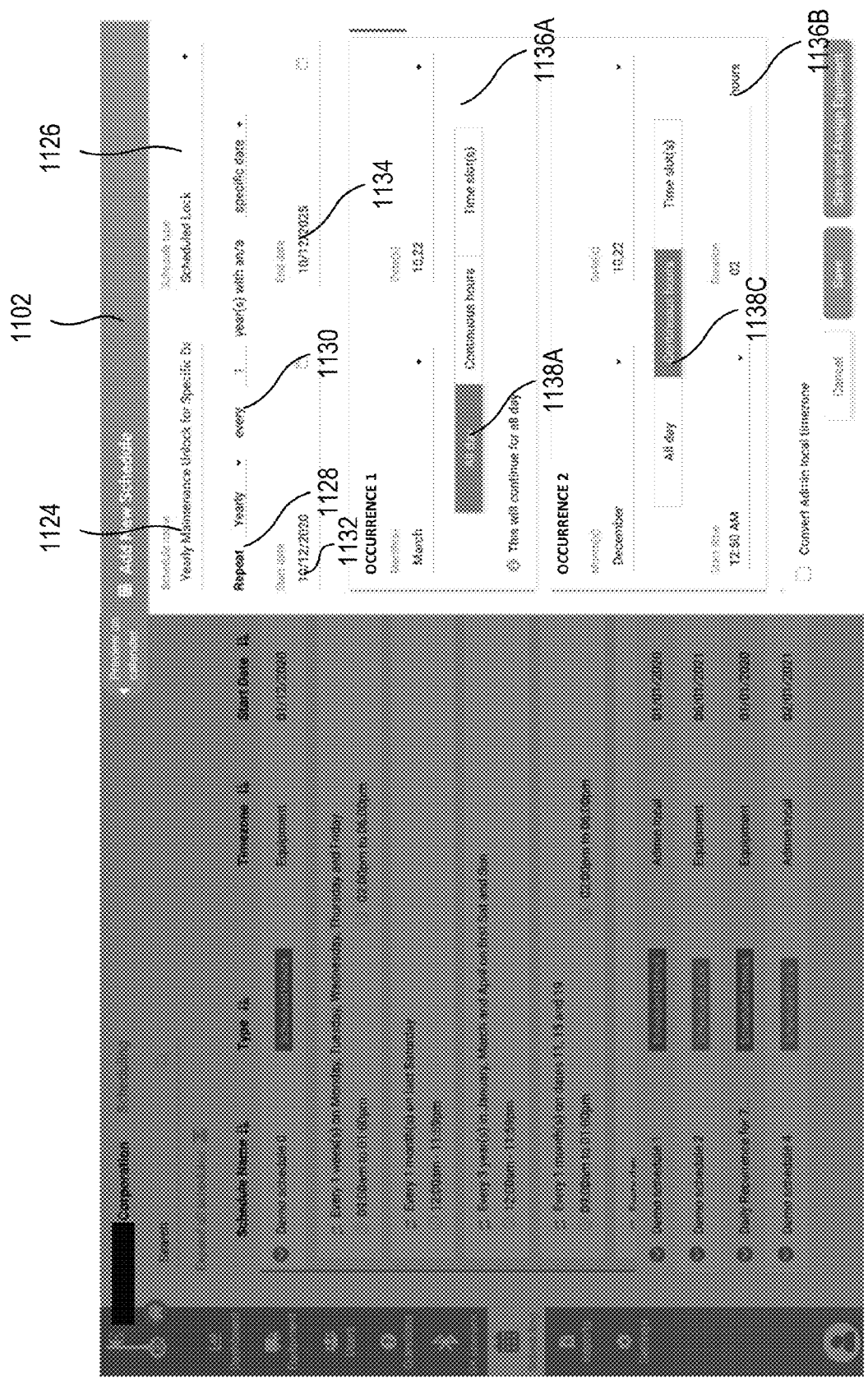
FIG. 22 illustrates a user interface generating another schedule according to various embodiments.

FIGS. 18-22 illustrate non-limiting embodiments of the user interface 1102 setting different schedules. FIG. 18 illustrates the user interface 1102 setting a schedule with a single recurrence, FIG. 19 illustrates the user interface 1102 setting a schedule with a daily recurrence repeating every day, FIG. 20 illustrates the user interface 1102 setting a schedule with a weekly recurrence repeating every week, FIG. 21 illustrates the user interface 1102 setting a schedule with a monthly recurrence repeating every month, FIG. 22 illustrates the user interface 1102 setting a schedule with a yearly recurrence repeating every year.

As illustrated in FIGS. 18-22, the user interface 1102 includes a selectable and/or engageable naming feature 1124 that a user may utilize to set the name of the schedule being created (e.g., pursuant to block 1202). Optionally, the user interface 1102 includes a selectable and/or engageable type feature 1126 that a user may utilize to set the type of schedule being created (e.g., scheduled lock, scheduled unlock, etc) (e.g., pursuant to block 1202). A selectable and/or engageable recurrence feature 1128 may be utilized by the user to set the recurrence of the schedule (e.g., pursuant to block 1204) Optionally, and as illustrated in FIGS. 19-23, a recurrence that is set to more than once optionally has a selectable and/or engageable recurrence frequency feature 1130 enabling the user to set a frequency of the recurrence of the schedule. In various embodiments, the user interface 1102 includes a selectable and/or engageable start date feature 1132 and end date feature 1134 enabling the user to set the start date and end date of the schedule (e.g., pursuant to block 1206). Optionally, and as illustrated in FIGS. 19-23, a recurrence that is set to more than once optionally has a selectable and/or engageable occurrence feature 1136 enabling the user to set one or more occurrences (e.g., pursuant to block 1208), and for each occurrence, selectable and/or engageable time slot features 1138A-C enabling the user to set an all day time slot 1138A, a segmented time slot 1138B, and/or a continuous hours time slot 1138C.

In FIG. 18, the user interface 1102 is illustrated setting a schedule having a schedule name of "Demo schedule" that is a scheduled lock. The schedule is set to repeat once, all day on Oct. 12, 2020.

In FIG. 19, the user interface 1102 is illustrated setting a schedule having a name of "Daily Recurrence for 7-Day Operation" that is a scheduled lock. The schedule is set to repeat every day from a start date of Jan. 12, 2020 to an end date of Oct. 20, 2020. The schedule has a single occurrence with an all day time slot. As such, the schedule is set to run every day, all day from Jan. 12, 2020 to Oct. 20, 2020.

In FIG. 20, the user interface 1102 is illustrated setting a schedule having a name of "Off-Shift During Week and Full Weekend" that is a scheduled lock. The schedule is set with a recurrence of every week from a start date of Jan. 1, 2020 to an end date of Mar. 31, 2020. Each recurrence has a first occurrence 1136A and a second occurrence 1136B. The first occurrence 1136A is set with the all day time slot 1138A on Saturday and Sunday. The second occurrence is set for Monday-Friday with one segmented time slot 1138B having a segment start time 1140 of 12:00 AM and a segment end time 1142 of 6:00 AM As such, between Jan. 1, 2020 and Mar. 31, 2020, this schedule will run every week, and each week the schedule will set a lock all day Saturday, all day Sunday, and from 12:00 AM to 6.00 AM on each of Monday-Friday.

In FIG. 21, the user interface 1102 is illustrated setting a schedule having a name of "Monthly Maintenance Unlock for Last Week" that is a scheduled lock. The schedule is set with a recurrence of every month from a start date of Jan. 1, 2020 to an end date of Dec. 31, 2020. Each recurrence has a first occurrence 1136A and a second occurrence 1136B. The first occurrence 1136A is set with the all day time slot 1138A on the last Tuesday and last Wednesday of the month. The second occurrence is set for the last Saturday of the month with the continuous hours time slot 1136C set to start at 12:00 AM and run for a duration of 48 hours. As such, between Jan. 1, 2020 and Dec. 31, 2020, this schedule will run every month, and each month the schedule will set a lock all day on the last Tuesday of the month, a lock all day on the last Wednesday of the month, and a lock starting at 12:00 AM on the last Saturday of the month that will run for 48 hours.

In FIG. 22, the user interface 1102 is illustrated setting a schedule having a name of "Yearly Maintenance Unlock for Specific Day" that is a scheduled lock. The schedule is set with a recurrence of every year from a start date of Oct. 12, 2020 to an end date of Oct. 12, 2025. Each recurrence has a first occurrence 1136A and a second occurrence 1136B. The first occurrence 1136A is set with the all day time slot 1138A on March $10^{th}$ and March $22^{nd}$. The second occurrence is set for with the continuous hours time slot 1136C with a start time of 12:50 AM and a duration of 2 hours on December $10^{th}$ and $22^{nd}$. As such, between Oct. 12, 2020 and Oct. 12, 2025, this schedule will run every year, and each year the schedule will set a lock all day on the March $10^{th}$, all day on March $22^{nd}$, from 12:50 AM to 2:50 AM on December $10^{th}$, and from 12:50 AM to 2:50 AM on December $22^{nd}$.

As mentioned, the user interfaces in FIGS. 18-22 are provided as non-limiting examples, and various other user interfaces may be realized.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A system for selectively enabling and disabling a powered system, the system comprising: an interlock device configured to selectively enable or disable operation of a powered system, wherein the interlock device comprises a communication module configured to wirelessly communicate with an access device; and a control system in wireless communication with the interlock device and configured to wirelessly communicate with the access device, wherein the control system is configured to: disable operation of the powered system; determine a position of the access device relative to the interlock device; responsive to a determination that the position of the access device is within a predetermined distance from the interlock device, provide at least one question to a user of the access device, receive at least one answer to the at least one question from a user of the access device; and enable operation of the powered system with the interlock device based on the position of the access device being within the predetermined distance and based on the at least one answer meeting a predetermined criteria, wherein the unlock signal causes the interlock device to enable operation of the powered system.

Illustration 2. The system of any preceding or subsequent illustrations or combination of illustrations, further comprising the access device in wireless communication with the interlock device and the control system.

Illustration 3. The system of any preceding or subsequent illustrations or combination of illustrations, wherein the control system is further configured to: receive a user credential from the access device, compare the user credential to authorized user credentials; and provide an access portal to the access device based on the user credential being an authorized user credential.

Illustration 4. The system of any preceding or subsequent illustrations or combination of illustrations, wherein the control system is further configured to: receive a user credential from the access device; determine an authorized powered system credential based on the user credential; compare the authorized powered system credential with an actual powered system credential of the powered system; display a first, selectable representation of the powered system on the access device based on the authorized power system credential matching the actual powered system credential; and displaying a second, non-selectable representation of the powered system on the access device based on the authorized power system credential not matching the actual powered system credential, wherein a selection of the selectable representation of the powered system provides the at least one question to the user on the access device.

Illustration 5. The system of any preceding or subsequent illustrations or combination of illustrations, wherein the control system is further configured to: receive a status of the powered system after transmitting the unlock signal; and transmit a lock signal to the interlock device based on the powered system having a deactivated status for a predetermined time period, wherein the lock signal causes the interlock device to disable operation of the powered system.

Illustration 6. The system of any preceding or subsequent illustrations or combination of illustrations, further comprising a sensor in wireless communication with the control system, wherein the sensor is configured to detect the status of the powered system.

Illustration 7 The system of any preceding or subsequent illustrations or combination of illustrations, wherein the control system is further configured to: receive a status of the powered system after transmitting the unlock signal, receive a communication status of the access device with the control system; and transmit a lock signal to the interlock device based on the powered system having an activated status and based on the communication status being deactivated for a predetermined time period, wherein the lock signal causes the interlock device to disable operation of the powered system.

Illustration 8. The system of any preceding or subsequent illustrations or combination of illustrations, further comprising a sensor in wireless communication with the control system, wherein the sensor is configured to detect the status of the powered system.

Illustration 9 The system of any preceding or subsequent illustrations or combination of illustrations, wherein the interlock device comprises a mechanical switch.

Illustration 10. The system of any preceding or subsequent illustrations or combination of illustrations, wherein the interlock device further comprises at least one visual indicator, and wherein the control system is configured to control at least one characteristic of the visual indicator based on a status of the interlock device.

Illustration 11. The system of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 12. The system of any preceding or subsequent illustrations or combination of illustrations, wherein the control system is configured to provide the at least one question by providing the at least one question with a predetermined set of answers, and wherein the control system is configured to receive the at least one answer by receiving at least one of a selection of one of the predetermined set of answers or a supplemental response that was not provided as one of the predetermined set of answers.

Illustration 13. The system of any preceding or subsequent illustrations or combination of illustrations, wherein the control system is further configured to receive a user credential and a request time from the access device; determine an authorized powered system credential based on the user credential; compare the authorized powered system credential with an actual powered system credential of the powered system; compare the request time to a schedule of the powered system; display a first selectable representation of the powered system on the access device based on the authorized power system credential matching the actual powered system credential and based on the request time being within a scheduled unlock on the schedule; and display a second, non-selectable representation of the powered system on the access device based on the authorized power system credential not matching the actual powered system credential or based on the request time being within a schedule lock on the schedule, wherein a selection of the selectable representation of the powered system provides the at least one question to the user on the access device.

Illustration 14. A method of selectively enabling and disabling a powered system, the method comprising: disabling operation of the powered system with an interlock device; receiving a position of an access device relative to an interlock device; determining whether the position with within a predetermined distance of the interlock device, responsive to determining that the position is within the predetermined distance, receiving at least one answer to at least one question from a user of the access device; and enabling operation of the powered system based on the position being within the predetermined distance and based on the at least one answer meeting a predetermined criteria.

Illustration 15 The method of any preceding or subsequent illustrations or combination of illustrations, further comprising: receiving a user credential from the access device before receiving the actual distance and the at least one answer, comparing the user credential to authorized user credentials; and providing an access portal to the access device based on the user credential being an authorized user credential.

Illustration 16 The method of any preceding or subsequent illustrations or combination of illustrations, further comprising: receiving a user credential from the access device before receiving the actual distance and the at least one answer; determining an authorized powered system credential based on the user credential; comparing the authorized powered system credential with an actual powered system credential of the powered system; displaying a first, selectable representation of the powered system on the access device based on the authorized power system credential matching the actual powered system credential; and displaying a second, non-selectable representation of the powered system on the access device based on the authorized power system credential not matching the actual powered system credential, wherein a selection of the selectable representation of the powered system provides the at least one question to the user on the access device.

Illustration 17. The method of any preceding or subsequent illustrations or combination of illustrations, further comprising: receiving a status of the powered system after enabling operation of the powered system; and disabling operation of the powered system with the interlock device based on the powered system having a deactivated status for a predetermined time period.

Illustration 18 The method of any preceding or subsequent illustrations or combination of illustrations, further comprising: receiving a status of the powered system after enabling operation of the powered system; receiving a communication status of the access device with a control system; and disabling operation of the powered system with the interlock device based on the powered system having an activated status and based on the communication status being deactivated for a predetermined time period.

Illustration 19. The method of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 20. The method of any preceding or subsequent illustrations or combination of illustrations, further comprising: receiving a user credential and a request time from the access device; determining an authorized powered system credential based on the user credential, comparing the authorized powered system credential with an actual powered system credential of the powered system; comparing the request time to a schedule of the powered system; displaying a first, selectable representation of the powered system on the access device based on the authorized power system credential matching the actual powered system credential and based on the request time being within a scheduled unlock on the schedule: and displaying a second, non-selectable representation of the powered system on the access device based on the authorized power system credential not matching the actual powered system credential or based on the request time being within a schedule lock on the schedule, wherein a selection of the selectable representation of the powered system provides the at least one question to the user on the access device.

Illustration 21. A system for selectively enabling and disabling a powered system, the system comprising: an interlock device configured to selectively enable or disable the powered system; and a control system in wireless communication with the interlock device, wherein the control system is configured to: disable operation of the powered system with the interlock device; receive at least one answer to at least one question from a user of an access device; enable operation of the powered system with the interlock device based on the at least one answer meeting a predetermined criteria; receive a status of the powered system after enabling operation of the powered system; and disable operation of the powered system with the interlock device based on the powered system having a deactivated status for a predetermined time period after enabling operation of the powered system.

Illustration 22. The system of any preceding or subsequent illustrations or combination of illustrations, further comprising the access device in wireless communication with the interlock device and the control system.

Illustration 23. The system of any preceding or subsequent illustrations or combination of illustrations, wherein the interlock device comprises a communication module configured to wirelessly communicate with an access device, wherein the control system is configured to wirelessly communicate with the access device, and wherein the control system is configured to, determine a location of the access device relative to the interlock device; and enable operation of the powered system with the interlock device based on the location of the access device being within a predetermined distance from the interlock device and based on the at least one answer meeting a predetermined criteria.

Illustration 24. The system of any preceding or subsequent illustrations or combination of illustrations, wherein the control system is further configured to: receive a user credential from the access device; compare the user credential to authorized user credentials; and provide an access portal to the access device based on the user credential being an authorized user credential.

Illustration 25. The system of any preceding or subsequent illustrations or combination of illustrations, wherein the control system is further configured to: receive a user credential from the access device; determine an authorized powered system credential based on the user credential, compare the authorized powered system credential with an actual powered system credential of the powered system, display a first, selectable representation of the powered system on the access device based on the authorized power system credential matching the actual powered system credential; and display a second, non-selectable representation of the powered system on the access device based on the authorized power system credential not matching the actual powered system credential, wherein a selection of the selectable representation of the powered system provides the at least one question to the user on the access device.

Illustration 26. The system of any preceding or subsequent illustrations or combination of illustrations, further comprising a sensor in wireless communication with the control system, wherein the sensor is configured to detect the status of the powered system.

Illustration 27. The system of any preceding or subsequent illustrations or combination of illustrations, wherein the control system is further configured to: receive a communication status of the access device with the control system after enabling operation of the powered system; and disable operation of the powered system with the interlock device based on the powered system having an activated status and based on the communication status being deactivated for a predetermined time period after enabling operation of the powered system.

Illustration 28. The system of any preceding or subsequent illustrations or combination of illustrations, further comprising a sensor in wireless communication with the control system, wherein the sensor is configured to detect the status of the powered system.

Illustration 29. The system of any preceding or subsequent illustrations or combination of illustrations, wherein the interlock device comprises a mechanical switch.

Illustration 30. The system of any preceding or subsequent illustrations or combination of illustrations, wherein the interlock device further comprises at least one visual indicator, and wherein the control system is configured to control at least one characteristic of the visual indicator based on a status of the interlock device.

Illustration 31. The system of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 32. The system of any preceding or subsequent illustrations or combination of illustrations, wherein the control system is configured to provide the at least one question by providing the at least one question with a predetermined set of answers, and wherein the control system is configured to receive the at least one answer by receiving at least one of a selection of one of the predetermined set of answers or a supplemental response that was not provided as one of the predetermined set of answers.

Illustration 33. The system of any preceding or subsequent illustrations or combination of illustrations, wherein the control system is further configured to receive a user credential and a request time from the access device; determine an authorized powered system credential based on the user credential; compare the authorized powered system credential with an actual powered system credential of the powered system: compare the request time to a schedule of the powered system; display a first, selectable representation of the powered system on the access device based on the authorized power system credential matching the actual powered system credential and based on the request time being within a scheduled unlock on the schedule: and display a second, non-selectable representation of the powered system on the access device based on the authorized power system credential not matching the actual powered system credential or based on the request time being within a schedule lock on the schedule, wherein a selection of the selectable representation of the powered system provides the at least one question to the user on the access device.

Illustration 34. A method of selectively enabling and disabling a powered system, the method comprising: disabling operation of the powered system with an interlock device: receiving at least one answer to at least one question from a user of an access device; and enabling operation of the powered system with the interlock device based on the at least one answer meeting a predetermined criteria: receiving a status of the powered system after enabling operation of the powered system; and disabling operation of the powered system with the interlock device based on the powered system having a deactivated status for a predetermined time period after enabling operation of the powered system.

Illustration 35. The method of any preceding or subsequent illustrations or combination of illustrations, further comprising: receiving a user credential from the access device before receiving the actual distance and the at least one answer; comparing the user credential to authorized user credentials; and providing an access portal to the access device based on the user credential being an authorized user credential.

Illustration 36. The method of any preceding or subsequent illustrations or combination of illustrations, further comprising: receiving a user credential from the access device before receiving the actual distance and the at least one answer; determining an authorized powered system credential based on the user credential, comparing the authorized powered system credential with an actual powered system credential of the powered system; displaying a first, selectable representation of the powered system on the access device based on the authorized power system credential matching the actual powered system credential; and displaying a second, non-selectable representation of the powered system on the access device based on the authorized power system credential not matching the actual powered system credential, wherein a selection of the selectable representation of the powered system provides the at least one question to the user on the access device.

Illustration 37. The method of any preceding or subsequent illustrations or combination of illustrations, wherein enabling operation of the powered system further comprises receiving a location of the access device relative to the interlock device; determining, by the control system, whether the access device is within a predetermined distance based on the received location, and enabling operation of the powered system with the interlock device based on the location being within a predetermined distance and based on the at least one answer meeting the predetermined criteria.

Illustration 38. The method of any preceding or subsequent illustrations or combination of illustrations, further comprising receiving a communication status of the access device with a control system after enabling operation of the powered system; and disabling operation of the powered system with the interlock device based on the powered system having an activated status and based on the communication status being deactivated for a predetermined time period.

Illustration 39. The method of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 40. The method of any preceding or subsequent illustrations or combination of illustrations, further comprising: receiving a user credential and a request time from the access device; determining an authorized powered system credential based on the user credential, comparing the authorized powered system credential with an actual powered system credential of the powered system; comparing the request time to a schedule of the powered system; displaying a first, selectable representation of the powered system on the access device based on the authorized power system credential matching the actual powered system credential and based on the request time being within a scheduled unlock on the schedule; and displaying a second, non-selectable representation of the powered system on the access device based on the authorized power system credential not matching the actual powered system credential or based on the request time being within a schedule lock on the schedule, wherein a selection of the selectable representation of the powered system provides the at least one question to the user on the access device.

Illustration 41. A system for selectively enabling and disabling a powered system, the system comprising, an interlock device configured to selectively enable or disable operation of the powered system; and a control system in wireless communication with the interlock device and configured to wirelessly communicate with an access device, wherein the control system is configured to: disable operation of the powered system with the interlock device; receive at least one answer to at least one question from a user of an access device; enable operation of the powered system with the interlock device based on the at least one answer meeting a predetermined criteria, receive a status of the powered system after enabling operation of the powered system; receive a communication status of the access device with the control system after enabling operation of the powered system; and disable operation of the powered system with the interlock device based on the powered system having an activated status and based on the communication status being deactivated for a predetermined time period after enabling operation of the powered system.

Illustration 42. The system of any preceding or subsequent illustrations or combination of illustrations, further comprising the access device in wireless communication with the interlock device and the control system.

Illustration 43. The system of any preceding or subsequent illustrations or combination of illustrations, wherein the interlock device comprises a communication module configured to wirelessly communicate with an access device, wherein the control system is configured to wirelessly communicate with the access device, and wherein the control system is configured to: receive position of the access device relative to the interlock device; and enable operation of the powered system with the interlock device based on the position being within a predetermined distance from the interlock device and based on the at least one answer to the at least one question meeting a predetermined criteria.

Illustration 44. The system of any preceding or subsequent illustrations or combination of illustrations, wherein the control system is further configured to: receive a user credential from the access device; compare the user credential to authorized user credentials; and provide an access portal to the access device based on the user credential being an authorized user credential.

Illustration 45. The system of any preceding or subsequent illustrations or combination of illustrations, wherein the control system is further configured to: receive a user credential from the access device, determine an authorized powered system credential based on the user credential; compare the authorized powered system credential with an actual powered system credential of the powered system; display a first, selectable representation of the powered system on the access device based on the authorized power system credential matching the actual powered system credential; and display a second, non-selectable representation of the powered system on the access device based on the authorized power system credential not matching the actual powered system credential, wherein a selection of the selectable representation of the powered system provides the at least one question to the user on the access device.

Illustration 46. The system of any preceding or subsequent illustrations or combination of illustrations, further comprising a sensor in wireless communication with the control system, wherein the sensor is configured to detect the status of the powered system.

Illustration 47. The system of any preceding or subsequent illustrations or combination of illustrations, wherein the control system is further configured to: disable operation of the powered system with the interlock device based on the powered system having a deactivated status for a predetermined time period after enabling operation of the powered system.

Illustration 48. The system of any preceding or subsequent illustrations or combination of illustrations, further comprising a sensor in wireless communication with the control system, wherein the sensor is configured to detect the status of the powered system.

Illustration 49. The system of any preceding or subsequent illustrations or combination of illustrations, wherein the interlock device comprises a mechanical switch.

Illustration 50. The system of any preceding or subsequent illustrations or combination of illustrations, wherein the interlock device further comprises at least one visual indicator, and wherein the control system is configured to control at least one characteristic of the visual indicator based on a status of the interlock device.

Illustration 51. The system of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 52. The system of any preceding or subsequent illustrations or combination of illustrations, wherein the control system is configured to provide the at least one question by providing the at least one question with a predetermined set of answers, and wherein the control system is configured to receive the at least one answer by receiving at least one of a selection of one of the predetermined set of answers or a supplemental response that was not provided as one of the predetermined set of answers.

Illustration 53. The system of any preceding or subsequent illustrations or combination of illustrations, wherein the control system is further configured to: receive a user credential and a request time from the access device; determine an authorized powered system credential based on the user credential, compare the authorized powered system credential with an actual powered system credential of the powered system; compare the request time to a schedule of the powered system; display a first, selectable representation of the powered system on the access device based on the authorized power system credential matching the actual powered system credential and based on the request time being within a scheduled unlock on the schedule; and display a second, non-selectable representation of the powered system on the access device based on the authorized power system credential not matching the actual powered system credential or based on the request time being within a scheduled lock on the schedule, wherein a selection of the selectable representation of the powered system provides the at least one question to the user on the access device.

Illustration 54. A method of selectively enabling and disabling a powered system, the method comprising: disabling operation of the powered system with an interlock device; receiving at least one answer to at least one question from a user of an access device; enabling operation of the powered system with the interlock device based on the at least one answer meeting a predetermined criteria; receiving a status of the powered system after enabling operation of the powered system; receiving a communication status of the access device after enabling operation of the powered system; and disabling operation of the powered system with the interlock device based on the powered system having an activated status and based on the communication status being deactivated for a predetermined time period after enabling operation of the powered system.

Illustration 55. The method of any preceding or subsequent illustrations or combination of illustrations, further comprising: receiving a user credential from the access device before receiving the actual distance and the at least one answer; comparing the user credential to authorized user credentials; and providing an access portal to the access device based on the user credential being an authorized user credential.

Illustration 56. The method of any preceding or subsequent illustrations or combination of illustrations, further comprising: receiving a user credential from the access device before receiving the actual distance and the at least one answer; determining an authorized powered system credential based on the user credential; comparing the authorized powered system credential with an actual powered system credential of the powered system; displaying a first, selectable representation of the powered system on the access device based on the authorized power system credential matching the actual powered system credential; and displaying a second, non-selectable representation of the powered system on the access device based on the authorized power system credential not matching the actual powered system credential, wherein a selection of the selectable representation of the powered system provides the at least one question to the user on the access device.

Illustration 57. The method of any preceding or subsequent illustrations or combination of illustrations, wherein enabling operation of the powered system further comprises receiving, by a control system, a position of the access device relative to the interlock device; comparing, by the control system, the position to a predetermined distance from the interlock device; and enabling operation of the powered system with the interlock device based on the position being within a predetermined distance and based on the at least one answer meeting the predetermined criteria.

Illustration 58. The method of any preceding or subsequent illustrations or combination of illustrations, further comprising: disabling operation of the powered system with the interlock device based on the powered system having a deactivated status for a predetermined time period.

Illustration 59. The method of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 60. The method of any preceding or subsequent illustrations or combination of illustrations, further comprising: receiving a user credential and a request time from the access device; determining an authorized powered system credential based on the user credential; comparing the authorized powered system credential with an actual powered system credential of the powered system; comparing the request time to a schedule of the powered system; displaying a first, selectable representation of the powered system on the access device based on the authorized power system credential matching the actual powered system credential and based on the request time being within a scheduled unlock on the schedule; and displaying a second, non-selectable representation of the powered system on the access device based on the authorized power system credential not matching the actual powered system credential or based on the request time being within a schedule lock on the schedule, wherein a selection of the selectable representation of the powered system provides the at least one question to the user on the access device.

Illustration 61. A method comprising requesting an event identification, wherein the event identification comprises desired recurrence comprising a recurrence unit of time that is greater than a minimum allowed unit of time, generating a set of scheduled times based on the event identification, wherein the set of scheduled times comprises a unit of time that is less than the recurrence unit of time; receiving a selection of a first duration having a first start time and a first end time in the set of scheduled times; receiving a selection of a second duration having a second start time and a second end time in the set of scheduled times, wherein the first duration is discontinuous with the second duration, and generating an event comprising the event identification: and generating a schedule comprising the event for the first duration and for the second duration in the set of scheduled times for the desired recurrence.

Illustration 62. A system for controlling a powered system, the system comprising a control system configured to wirelessly communicate with an access device and a powered system, wherein the control system is configured to: disable operation of the powered system; receive a user credential from the access device; compare the user credential to authorized user credentials; and provide an access portal to the access device based on the user credential being an authorized user credential; receive a selection of the powered system from the access device; responsive to receiving the selection of the powered system from the access device and based on the user credential being the authorized user credential, provide at least one question to a user of the access device; receive at least one answer to the at least one question from a user of the access device; and enable operation of the powered system based on the at least one answer meeting a predetermined criteria.

Illustration 63. The system of any preceding or subsequent illustrations or combination of illustrations, further comprising the access device; and an interlock device configured to selectively enable or disable operation of the powered system, wherein the interlock device comprises a communication module configured to wirelessly communicate with the access device, wherein the control system is configured to enable or disable operation of the powered system via the interlock device.

Illustration 64. The system of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 65. The system of any preceding or subsequent illustrations or combination of illustrations, wherein the at least one question further comprises a user credential question, wherein the at least one answer further comprises a user credential answer, and wherein the predetermined criteria comprises the user credential answer matching an accepted user credential answer.

Illustration 66. The system of any preceding or subsequent illustrations or combination of illustrations, wherein the control system is further configured to: determine an authorized powered system credential based on the user credential, compare the authorized powered system credential with an actual powered system credential of the powered system: display a first, selectable representation of the powered system on the access device based on the authorized power system credential matching the actual powered system credential; and displaying a second, non-selectable representation of the powered system on the access device based on the authorized power system credential not matching the actual powered system credential, wherein a selection of the selectable representation of the powered system provides the at least one question to the user on the access device.

Illustration 67. A system for controlling a powered system, the system comprising: an interlock device configured to selectively enable or disable operation of a powered system, wherein the interlock device comprises a communication module configured to wirelessly communicate with an access device; and a control system in wireless communication with the interlock device and configured to wirelessly communicate with the access device, wherein the control system is configured to: disable operation of the powered system: determine a position of the access device relative to the interlock device; responsive to a determination that the position of the access device is within a predetermined distance from the interlock device, provide at least one question to a user of the access device; receive at least one answer to the at least one question from a user of the access device; and enable operation of the powered system with the interlock device based on the position of the access device being within the predetermined distance and based on the at least one answer meeting a predetermined criteria.

Illustration 68. The system of any preceding or subsequent illustrations or combination of illustrations, wherein the control system is further configured to: receive a user credential from the access device; compare the user credential to authorized user credentials; and provide an access portal to the access device based on the user credential being an authorized user credential.

Illustration 69. The system of any preceding or subsequent illustrations or combination of illustrations, wherein the control system is further configured to: receive a user credential from the access device, determine an authorized powered system credential based on the user credential; compare the authorized powered system credential with an actual powered system credential of the powered system; display a first, selectable representation of the powered system on the access device based on the authorized power system credential matching the actual powered system credential; and displaying a second, non-selectable representation of the powered system on the access device based on the authorized power system credential not matching the actual powered system credential, wherein a selection of the selectable representation of the powered system provides the at least one question to the user on the access device.

Illustration 70. The system of any preceding or subsequent illustrations or combination of illustrations, wherein the control system is further configured to: receive a status of the powered system enabling operation of the powered system; receive a communication status of the access device with the control system; and transmit a lock signal to the interlock device based on the powered system having an activated status and based on the communication status being deactivated for a predetermined time period, wherein the lock signal causes the interlock device to disable operation of the powered system.

Illustration 71. The system of any preceding or subsequent illustrations or combination of illustrations, wherein the at least one question comprises a test question and a survey question, wherein the at least one answer comprises a test question answer and a survey question answer, and wherein the predetermined criteria comprises at least the test question answer matching an accepted test question answer.

Illustration 72. The system of any preceding or subsequent illustrations or combination of illustrations, wherein the control system is further configured to: receive a user credential and a request time from the access device; determine an authorized powered system credential based on the user credential, compare the authorized powered system credential with an actual powered system credential of the powered system; compare the request time to a schedule of the powered system; display a first, selectable representation of the powered system on the access device based on the authorized power system credential matching the actual powered system credential and based on the request time being within a scheduled unlock on the schedule; and displaying a second, non-selectable representation of the powered system on the access device based on the authorized power system credential not matching the actual powered system credential or based on the request time being within a schedule lock on the schedule, wherein a selection of the selectable representation of the powered system provides the at least one question to the user on the access device.

Illustration 73. A method for controlling a controllable identification, the method comprising: receiving, by a scheduling module, an event identification comprising an event type, an event start date, and an event end date; receiving, by the scheduling module, a recurrence for the event identification, wherein the recurrence repeats the event identification at a recurrence interval, receiving, by the scheduling module, an occurrence for the event identification within a single recurrence interval, wherein the occurrence comprises a first time slot for the event identification within the single recurrence interval and a second time slot for the event identification within the single recurrence interval, wherein the first time slot and the second time slot are discontinuous; generating a schedule comprising the occurrence of the event identification repeated at the recurrence interval starting at the event start date; assigning the schedule to at least one controllable identification; receiving an actual time; and controlling the at least one controllable identification based on the actual time being within the first time slot or the second time slot.

Illustration 74. The method of any preceding or subsequent illustrations or combination of illustrations, wherein the controllable identification comprises at least one of at least one powered system, at least one interlock device, at least one user credential, or at least one test question.

Illustration 75. The method of any preceding or subsequent illustrations or combination of illustrations, wherein the event type comprises a scheduled lock, and wherein controlling the at least one controllable identification comprises locking the controllable identification based on the actual time being within the first time slot or the second time slot.

Illustration 76. The method of any preceding or subsequent illustrations or combination of illustrations, wherein the event type comprises a scheduled unlock, and wherein controlling the at least one controllable identification comprises unlocking the controllable identification based on the actual time being within the first time slot or the second time slot.

Illustration 77. The method of any preceding or subsequent illustrations or combination of illustrations, wherein controlling the at least one controllable identification comprises transmitting a control signal to the controllable identification.

Illustration 78. The method of any preceding or subsequent illustrations or combination of illustrations, wherein the occurrence is a first occurrence, wherein the method further comprises receiving a second occurrence comprising a third time slot for the event identification, and wherein generating the schedule comprises generating the schedule comprising the first occurrence and the second occurrence of the event identification repeated at the recurrence interval starting at the event start date.

Illustration 79. The method of any preceding or subsequent illustrations or combination of illustrations, wherein the event identification is a first event identification and the schedule is a first schedule, and wherein the method further comprises receiving, by the scheduling module, a second event identification comprising an event type, an event start date, and an event end date; receiving, by the scheduling module, a recurrence for the second event identification, wherein the recurrence for the second event identification repeats the second event identification at a recurrence interval, receiving, by the scheduling module, a second event occurrence for the second event identification within a single recurrence interval for the second event identification, wherein the second event occurrence comprises at least one time slot; generating a second schedule comprising the second event occurrence of the second event identification repeated at the recurrence interval for the second event identification starting at the event start date of the second event identification; assigning the schedule to the at least one controllable identification; receiving an actual time; and controlling the at least one controllable identification based on the actual time being within the first time slot or the second time slot of the first schedule or based on the actual time being within the at least one time slot of the second schedule.

Illustration 80. The method of any preceding or subsequent illustrations or combination of illustrations, further comprising comparing the event type of the second event identification and the event type of the first event identification and merging the first schedule with the second schedule based on the event types matching.

Illustration 80.a. The method of any preceding or subsequent illustrations or combination of illustrations, wherein the recurrence interval comprises at least one of a daily interval, a weekly interval, a monthly interval, or a yearly interval, and wherein the first time slot and the second time slot each comprise at least one of an all day time slot, a segmented time slot, or a continuous hour time slot.

Illustration 81. A method for generating a graphical user interface, the method comprising: receiving an event identification comprising an event type, an event start date, and an event end date; receiving a recurrence for the event identification, wherein the recurrence repeats the event identification at a recurrence interval; receiving an occurrence for the event identification within a single recurrence interval, wherein the occurrence comprises a first time slot for the event identification within the single recurrence interval and a second time slot for the event identification within the single recurrence interval, wherein the first time slot and the second time slot are discontinuous; determining pairings between the event identification and one or more controllable identifications; generating a schedule comprising the occurrence of the event identification repeated at the recurrence interval starting at the event start date and based on the pairings, and displaying the schedule on the graphical user interface.

Illustration 82. The method of claim 21, further comprising: receiving an actual time; and controlling at least one characteristic of the graphical user interface based on the actual time being within the first time slot or the second time slot.

Illustration 83. The method of any preceding or subsequent illustrations or combination of illustrations, wherein the at least one characteristic comprises an event type status or a visual indicator on the graphical user interface.

Illustration 84. The method of any preceding or subsequent illustrations or combination of illustrations, wherein receiving the occurrence comprises receiving a selectable occurrence field.

Illustration 85. The method of any preceding or subsequent illustrations or combination of illustrations, wherein receiving the selectable occurrence field comprises receiving a selectable first time slot field and receiving a selectable second time slot field.

Illustration 86. The method of any preceding or subsequent illustrations or combination of illustrations, wherein receiving the recurrence comprises receiving a selectable recurrence field.

Illustration 87. The method of any preceding or subsequent illustrations or combination of illustrations, wherein the controllable identification comprises at least one of at least one powered system, at least one interlock device, at least one user credential, or at least one test question.

Illustration 88. The method of any preceding or subsequent illustrations or combination of illustrations, wherein receiving the event identification comprises receiving a selectable event start date field, a selectable event end date field, and a selectable event type field.

Illustration 89. The method of any preceding or subsequent illustrations or combination of illustrations, further comprising controlling the controllable identification based on the schedule, wherein the event type comprises a scheduled lock or a scheduled unlock, and wherein controlling the at least one controllable identification comprises locking the controllable identification based on the actual time being within the first time slot or the second time slot if the event type is a scheduled lock and unlocking the controllable identification based on the actual time being within the first time slot or the second time slot if the event type is a scheduled lock.

Illustration 90. The method of any preceding or subsequent illustrations or combination of illustrations, wherein controlling the at least one controllable identification comprises transmitting a control signal to the controllable identification.

Illustration 91. The method of any preceding or subsequent illustrations or combination of illustrations, wherein the occurrence is a first occurrence, wherein the method further comprises receiving a second occurrence comprising a third time slot for the event identification, and wherein generating the schedule comprises generating the schedule comprising the first occurrence and the second occurrence of the event identification repeated at the recurrence interval starting at the event start date.

Illustration 92. The method of any preceding or subsequent illustrations or combination of illustrations, wherein the event identification is a first event identification and the schedule is a first schedule, and wherein the method further comprises, receiving a second event identification comprising an event type, an event start date, and an event end date; receiving a recurrence for the second event identification, wherein the recurrence for the second event identification repeats the second event identification at a recurrence interval; receiving a second event occurrence for the second event identification within a single recurrence interval for the second event identification, wherein the second event occurrence comprises at least one time slot; determining pairings between the second event identification and the one or more controllable identifications; generating a second schedule comprising the second event occurrence of the second event identification repeated at the recurrence interval for the second event identification starting at the event start date of the second event identification and based on the pairings; and displaying the second schedule on the graphical user interface.

Illustration 93. The method of any preceding or subsequent illustrations or combination of illustrations, further comprising: receiving an actual time; and controlling the at least one controllable identification based on the actual time being within the first time slot or the second time slot of the first schedule or based on the actual time being within the at least one time slot of the second schedule.

Illustration 94. The method of any preceding or subsequent illustrations or combination of illustrations, further comprising comparing the event type of the second event identification and the event type of the first event identification and merging the first schedule with the second schedule based on the event types matching.

Illustration 95. The method of any preceding or subsequent illustrations or combination of illustrations, wherein the recurrence interval comprises at least one of a daily interval, a weekly interval, a monthly interval, or a yearly interval, and wherein the first time slot and the second time slot each comprise at least one of an all day time slot, a segmented time slot, or a continuous hour time slot.

Illustration 96. A system comprising at least one processor and at least one memory operably coupled to the at least one processor, wherein the memory comprises instructions executable by the at least one processor to: receive an event identification comprising an event type, an event start date, and an event end date; Illustration receive a recurrence for the event identification, wherein the recurrence repeats the event identification at a recurrence interval; receive an occurrence for the event identification within a single recurrence interval, wherein the occurrence comprises a first time slot for the event identification within the single recurrence interval and a second time slot for the event identification within the single recurrence interval, wherein the first time slot and the second time slot are discontinuous; determine pairings between the event identification and one or more controllable identifications; generate a schedule comprising the occurrence of the event identification repeated at the recurrence interval starting at the event start date and based on the pairings; and display the schedule on a graphical user interface.

Illustration 97. The system of any preceding or subsequent illustrations or combination of illustrations, further comprising instructions for receiving an actual time and controlling at least one characteristic of the graphical user interface based on the actual time being within the first time slot or the second time slot.

Illustration 98. The system of any preceding or subsequent illustrations or combination of illustrations, wherein the at least one characteristic comprises an event type status or a visual indicator on the graphical user interface.

Illustration 99. The system of any preceding or subsequent illustrations or combination of illustrations, wherein the instructions for receiving the occurrence comprises instructions for receiving a selectable occurrence field.

Illustration 100. The system of any preceding or subsequent illustrations or combination of illustrations, wherein the instructions for receiving the selectable occurrence field comprises instructions for receiving a selectable first time slot field and receiving a selectable second time slot field.

Illustration 101. The system of any preceding or subsequent illustrations or combination of illustrations, wherein the instructions for receiving the recurrence comprises instructions for receiving a selectable recurrence field.

Illustration 102. The system of any preceding or subsequent illustrations or combination of illustrations, wherein the controllable identification comprises at least one of at least one powered system, at least one interlock device, at least one user credential, or at least one test question.

Illustration 103. The system of any preceding or subsequent illustrations or combination of illustrations, wherein the instructions for receiving the event identification comprises instructions for receiving a selectable event start date field, a selectable event end date field, and a selectable event type field.

Illustration 104. The system of any preceding or subsequent illustrations or combination of illustrations, further comprising instructions for controlling the controllable identification based on the schedule, wherein the event type comprises a scheduled lock or a scheduled unlock, and wherein controlling the at least one controllable identification comprises locking the controllable identification based on the actual time being within the first time slot or the second time slot if the event type is a scheduled lock and unlocking the controllable identification based on the actual time being within the first time slot or the second time slot if the event type is a scheduled lock.

Illustration 105. The system of any preceding or subsequent illustrations or combination of illustrations, wherein the instructions for controlling the at least one controllable identification comprises instructions for transmitting a control signal to the controllable identification.

Illustration 106. The system of any preceding or subsequent illustrations or combination of illustrations, wherein the occurrence is a first occurrence, wherein the instructions further comprises instructions for receiving a second occurrence comprising a third time slot for the event identification, and wherein the instructions for generating the schedule comprises instructions for generating the schedule comprising the first occurrence and the second occurrence of the event identification repeated at the recurrence interval starting at the event start date.

Illustration 107. The system of any preceding or subsequent illustrations or combination of illustrations, wherein the event identification is a first event identification and the schedule is a first schedule, and wherein the instructions further comprises instructions executable by the at least one processor to receive a second event identification comprising an event type, an event start date, and an event end date; receive a recurrence for the second event identification, wherein the recurrence for the second event identification repeats the second event identification at a recurrence interval; receive a second event occurrence for the second event identification within a single recurrence interval for the second event identification, wherein the second event occurrence comprises at least one time slot; determine pairings between the second event identification and the one or more controllable identifications; generate a second schedule comprising the second event occurrence of the second event identification repeated at the recurrence interval for the second event identification starting at the event start date of the second event identification and based on the pairings; and display the second schedule on the graphical user interface.

Illustration 108. The system of any preceding or subsequent illustrations or combination of illustrations, further comprising instructions for receiving an actual time and controlling the at least one controllable identification based on the actual time being within the first time slot or the second time slot of the first schedule or based on the actual time being within the at least one time slot of the second schedule.

Illustration 109. The system of any preceding or subsequent illustrations or combination of illustrations, further comprising instructions for comparing the event type of the second event identification and the event type of the first event identification and merging the first schedule with the second schedule based on the event types matching.

Illustration 110. The system of any preceding or subsequent illustrations or combination of illustrations, wherein the recurrence interval comprises at least one of a daily interval, a weekly interval, a monthly interval, or a yearly interval, and wherein the first time slot and the second time slot each comprise at least one of an all day time slot, a segmented time slot, or a continuous hour time slot.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A system for controlling a powered system, the system comprising:
   an interlock device configured to selectively enable or disable operation of a powered system, wherein the interlock device comprises a communication module configured to wirelessly communicate with an access device; and
   a control system in wireless communication with the interlock device and configured to wirelessly communicate with the access device, wherein the control system is configured to:
   disable operation of the powered system;
   determine a position of the access device relative to the interlock device;
   provide at least one question to a user of the access device responsive to a determination that the position of the access device is within a predetermined distance from the interlock device;
   receive at least one answer to the at least one question from a user of the access device; and
   enable operation of the powered system with the interlock device responsive to both (i) the position of the access device being within the predetermined distance and (ii) the at least one answer meeting a predetermined criteria.

2. The system of claim 1, wherein the control system is further configured to:
   receive a user credential from the access device;
   compare the user credential to authorized user credentials; and
   provide an access portal to the access device based on the user credential being an authorized user credential.

3. The system of claim 1, wherein the control system is further configured to:
   receive a status of the powered system enabling operation of the powered system;
   receive a communication status of the access device with the control system; and
   transmit a lock signal to the interlock device based on the powered system having an activated status and based on the communication status being deactivated for a predetermined time period, wherein the lock signal causes the interlock device to disable operation of the powered system.

4. The system of claim 1, wherein the at least one question comprises a test question and a survey question, wherein the at least one answer comprises a test question answer and a survey question answer, and wherein the predetermined criteria comprises at least the test question answer matching an accepted test question answer.

5. The system of claim 1, further comprising the access device in wireless communication with the interlock device and the control system.

6. The system of claim 1, further comprising a sensor in wireless communication with the control system, wherein the sensor is configured to detect a status of the powered system.

7. The system of claim 1, wherein the interlock device comprises a mechanical switch.

8. The system of claim 7, wherein the interlock device further comprises at least one visual indicator, and wherein the control system is configured to control at least one characteristic of the visual indicator based on a status of the interlock device.

9. The system of claim 1, wherein the control system is configured to provide the at least one question by providing the at least one question with a predetermined set of answers, and wherein the control system is configured to receive the at least one answer by receiving at least one of a selection of one of the predetermined set of answers or a supplemental response that was not provided as one of the predetermined set of answers.

10. A system for controlling a powered system, the system comprising:
    an interlock device configured to selectively enable or disable operation of a powered system, wherein the interlock device comprises a communication module configured to wirelessly communicate with an access device; and
    a control system in wireless communication with the interlock device and configured to wirelessly communicate with the access device, wherein the control system is configured to:
    disable operation of the powered system;
    determine a position of the access device relative to the interlock device;
    responsive to a determination that the position of the access device is within a predetermined distance from the interlock device, provide at least one question to a user of the access device;
    receive at least one answer to the at least one question from a user of the access device; and
    enable operation of the powered system with the interlock device based on the position of the access device being within the predetermined distance and based on the at least one answer meeting a predetermined criteria, wherein the control system is further configured to:
    receive a user credential from the access device;
    determine an authorized powered system credential based on the user credential;

compare the authorized powered system credential with an actual powered system credential of the powered system;
display a first, selectable representation of the powered system on the access device based on the authorized power system credential matching the actual powered system credential; and
displaying a second, non-selectable representation of the powered system on the access device based on the authorized power system credential not matching the actual powered system credential,
wherein a selection of the selectable representation of the powered system provides the at least one question to the user on the access device.

11. A system for controlling a powered system, the system comprising:
an interlock device configured to selectively enable or disable operation of a powered system, wherein the interlock device comprises a communication module configured to wirelessly communicate with an access device; and
a control system in wireless communication with the interlock device and configured to wirelessly communicate with the access device, wherein the control system is configured to:
disable operation of the powered system;
determine a position of the access device relative to the interlock device;
responsive to a determination that the position of the access device is within a predetermined distance from the interlock device, provide at least one question to a user of the access device;
receive at least one answer to the at least one question from a user of the access device; and
enable operation of the powered system with the interlock device based on the position of the access device being within the predetermined distance and based on the at least one answer meeting a predetermined criteria,
wherein the control system is further configured to:
receive a user credential and a request time from the access device;
determine an authorized powered system credential based on the user credential;
compare the authorized powered system credential with an actual powered system credential of the powered system;
compare the request time to a schedule of the powered system;
display a first, selectable representation of the powered system on the access device based on the authorized power system credential matching the actual powered system credential and based on the request time being within a scheduled unlock on the schedule; and
displaying a second, non-selectable representation of the powered system on the access device based on the authorized power system credential not matching the actual powered system credential or based on the request time being within a schedule lock on the schedule, wherein a selection of the selectable representation of the powered system provides the at least one question to the user on the access device.

12. A system for controlling a powered system, the system comprising:
an interlock device configured to selectively enable or disable operation of a powered system, wherein the interlock device comprises a communication module configured to wirelessly communicate with an access device; and
a control system in wireless communication with the interlock device and configured to wirelessly communicate with the access device, wherein the control system is configured to:
disable operation of the powered system;
determine a position of the access device relative to the interlock device;
responsive to a determination that the position of the access device is within a predetermined distance from the interlock device, provide at least one question to a user of the access device;
receive at least one answer to the at least one question from a user of the access device; and
enable operation of the powered system with the interlock device based on the position of the access device being within the predetermined distance and based on the at least one answer meeting a predetermined criteria,
wherein the control system is further configured to:
receive a status of the powered system after enabling operation of the powered system;
receive a communication status of the access device with the control system; and
transmit a lock signal to the interlock device based on the powered system having an activated status and based on the communication status being deactivated for a predetermined time period, wherein the lock signal causes the interlock device to disable operation of the powered system.

13. A system for selectively enabling and disabling a powered system, the system comprising:
an interlock device configured to selectively enable or disable the powered system; and
a control system in wireless communication with the interlock device, wherein the control system is configured to:
disable operation of the powered system with the interlock device;
receive at least one answer to at least one question from a user of an access device;
enable operation of the powered system with the interlock device based on the at least one answer meeting a predetermined criteria;
receive a status of the powered system after enabling operation of the powered system; and
disable operation of the powered system with the interlock device based on the powered system having a deactivated status for a predetermined time period after enabling operation of the powered system.

14. The system of claim 13, wherein the interlock device comprises a communication module configured to wirelessly communicate with an access device, wherein the control system is configured to wirelessly communicate with the access device, and wherein the control system is configured to:
determine a location of the access device relative to the interlock device; and
enable operation of the powered system with the interlock device based on the location of the access device being within a predetermined distance from the interlock device and based on the at least one answer meeting a predetermined criteria.

15. The system of claim 13, wherein the control system is further configured to:

receive a user credential from the access device;
compare the user credential to authorized user credentials; and
provide an access portal to the access device based on the user credential being an authorized user credential.

16. The system of claim 13, wherein the control system is further configured to:
receive a user credential from the access device;
determine an authorized powered system credential based on the user credential;
compare the authorized powered system credential with an actual powered system credential of the powered system;
display a first, selectable representation of the powered system on the access device based on the authorized power system credential matching the actual powered system credential; and
display a second, non-selectable representation of the powered system on the access device based on the authorized power system credential not matching the actual powered system credential, wherein a selection of the selectable representation of the powered system provides the at least one question to the user on the access device.

17. A system for selectively enabling and disabling a powered system, the system comprising:
an interlock device configured to selectively enable or disable operation of the powered system; and
a control system in wireless communication with the interlock device and configured to wirelessly communicate with an access device, wherein the control system is configured to:
disable operation of the powered system with the interlock device;
receive at least one answer to at least one question from a user of an access device;
enable operation of the powered system with the interlock device based on the at least one answer meeting a predetermined criteria;
receive a status of the powered system after enabling operation of the powered system;
receive a communication status of the access device with the control system after enabling operation of the powered system;
and disable operation of the powered system with the interlock device based on the powered system having an activated status and based on the communication status being deactivated for a predetermined time period after enabling operation of the powered system.

18. The system of claim 17, wherein the interlock device comprises a communication module configured to wirelessly communicate with an access device, wherein the control system is configured to wirelessly communicate with the access device, and wherein the control system is configured to:
receive position of the access device relative to the interlock device; and
enable operation of the powered system with the interlock device based on the position being within a predetermined distance from the interlock device and based on the at least one answer to the at least one question meeting a predetermined criteria.

19. The system of claim 17, wherein the control system is further configured to:
receive a user credential from the access device;
compare the user credential to authorized user credentials; and
provide an access portal to the access device based on the user credential being an authorized user credential.

* * * * *